(12) United States Patent
Li et al.

(10) Patent No.: US 7,492,943 B2
(45) Date of Patent: Feb. 17, 2009

(54) OPEN SET RECOGNITION USING TRANSDUCTION

(75) Inventors: Fayin Li, Burke, VA (US); Harry Wechsler, Fairfax, VA (US)

(73) Assignee: George Mason Intellectual Properties, Inc., Fairfax, VA (US)

(*) Notice: Subject to any disclaimer, the term of this patent is extended or adjusted under 35 U.S.C. 154(b) by 731 days.

(21) Appl. No.: 11/075,982

(22) Filed: Mar. 10, 2005

(65) Prior Publication Data

US 2006/0093208 A1  May 4, 2006

Related U.S. Application Data

(60) Provisional application No. 60/623,064, filed on Oct. 29, 2004.

(51) Int. Cl.
  *G06K 9/62* (2006.01)
  *G06K 9/00* (2006.01)
(52) U.S. Cl. .................. 382/159; 382/115; 382/224
(58) Field of Classification Search ........ 382/159, 382/115, 224
See application file for complete search history.

(56) References Cited

U.S. PATENT DOCUMENTS

| | | | | |
|---|---|---|---|---|
| 3,902,160 A | * | 8/1975 | Kawa | 382/224 |
| 5,271,088 A | * | 12/1993 | Bahler | 704/200 |
| 6,246,794 B1 | * | 6/2001 | Kagehiro et al. | 382/185 |
| 7,072,873 B1 | * | 7/2006 | Gammerman et al. | 706/20 |

FOREIGN PATENT DOCUMENTS

JP          09128487 A  *  5/1997

OTHER PUBLICATIONS

"Open set text-independent speaker recognition based on set-score pattern claasification" Jiuqing Deng; Qixiu Hu; Acoustics, Speech, and Signal Processing, 2003. Proceedings. (ICASSP '03) Conference on vol. 2, Apr. 6-10, 2003 pp. II—73-76 vol. 2.*
"Transductive confidence machine for active learning" Shen-Shyang Ho; Wechsler, H.; Neural Networks, 2003. Proceedings of the International Joint Conference on vol. 2, Jul. 20-24, 2003 pp. 1435-1440 vol. 2.*

(Continued)

*Primary Examiner*—Wenpeng Chen
(74) *Attorney, Agent, or Firm*—Davis Grossman

(57) ABSTRACT

An open set recognition system utilizing transductive inference including capture device(s), a basis, quality checker(s), feature extractor(s), a gallery, a rejection threshold, a storage mechanism, and a recognition stage. The basis encodes sample(s) and is derived using training samples. The feature extractor(s) generates signature(s) from sample(s) using the basis. The rejection threshold is created using a rejection threshold learning mechanism that calculates the rejection threshold using sample(s) by: swapping a sample identifier with other sample identifier(s); computing a credibility value for the swapped sample identifiers; deriving a peak-to-side ratio distribution using the credibility values; and determining the rejection threshold using the peak-to-side ratio distribution. The open set recognition stage authenticates or reject as unknown the identity of unknown sample(s) using derived credibility values, derived peak-to-side ratios for the unknown sample and the rejection threshold.

21 Claims, 11 Drawing Sheets

OTHER PUBLICATIONS

Automatic Determination of Reject Thresholds in Classifiers Employing Discriminant Functions, H. C. Yau and M. T. Manry, IEEE Transactions on Signal Processing. vol. 40. No. 3 Mar. 1992, pp. 711-713.*

"To Reject or Not to Reject: That is the Question—An Answer in Case of Neural Classifiers", Claudio De Stefano, Carlo Sansone, and Mario Vento, IEEE Transactions on Systems, Man, and Cybernetics—Part C: Applications and Reviews, vol. 30, No. 1, Feb. 2000, pp. 84-94.*

"Moderating the Outputs of Support Vector Machine Classifiers", James Tin-Yau Kwok, IEEE Transactions on Neural Networks, vol. 10, No. 5, Sep. 1999, 1018-1031.*

E. Bailly-Bailliere et al. (2003), The BANCA Database and Evaluation Protocol, 4th Audio-Video Based Person Authentication (AVBPA), 625-638.

S. Bengio, J. Mariethoz, and S. Marcel (2001), Evaluation of Biometric Technology on XM2VTS, IDIAP-RR 01-21, European Project BANCA Deliverable D71, Martigny, Switzerland.

A. Blum and T. Mitchell (1998), Combining Labeled and Unlabeled Data with Co-Training, in COLT: Proc. of the Workshop on Computational Learning Theory, Morgan Kaufmann, 92-100.

R. Chellappa, C. L. Wilson and S. Sirohey (1995), Human and Machine Recognition of Faces: A Survey, Proc. IEEE, vol. 83, No. 5, 705-740.

T. M. Cover and P. E. Hart (1967), Nearest neighbor pattern classification, IEEE Trans. Inform. Theory IT 13:21-7.

P. Grother (2004), Face Recognition Vendor Test 2002, Supplemental Report—NISTIR 7083.

J. Daugman (1997), Face and Gesture Recognition: Overview, IEEE Trans. on PAMI, vol. 19, 7, 675-676.

G. R. Doddington, W. Liggett, A. Martin, M. Przybocki and D. Reynolds (1998), Sheep, Goats, Lambs and Wolves: A Statistical Analysis of Speaker Performance, Proc. Of IC-SLD'98, 1351-1354.

S. Furui (1997), Recent Advances in Speaker Recognition, Pattern Recognition Letters, 18, 859-872.

A. Gammerman, V. Vovk, and V. Vapnik (1998), Learning by Transduction. In Uncertainty in Artificial Intelligence, 148-155.

A. Jain and A. Ross (2004), Multibiometric Systems, Comm. of ACM, vol. 47, No. 1,34-40.

T. Joachims (1999), Transductive Inference for Text Classification Using Support Vector Machines, in I. Bratko and S. Dzeroski (eds.), Proc. Of ICML-99, 16th Int. Conf. on Machine Learning, Bled, Slovenia, Morgan Kaufmann, 200-209.

P. Juszczak and R. P. W. Duin (2004), Selective Sampling Based on the Variation in Label Assignment, 17th Int. Conf. on Pattern Recognition (ICPR), Cambridge, England.

M. A. Krogel and T. Scheffer (2004), Multi-Relational Learning, Text Mining, and Semi-Supervised Learning from Functional Genomics, Machine Learning, 57, 61-81.

M. Kukar and I. kononenko (2002), Relaible Classifications with Machine Learning, 13th European Conf. on Machine Learning (ECML), Helsinki, Finland.

C. Liu and H. Wechsler (2002), Gabor Feature Based Classification Using the Enhanced Fisher Linear Discriminant Model for Face Recognition, IEEE Trans. on Image Processing, vol. 11, No. 4, 467-476.

M.W. Mak, W.D. Zhang and M.X. He (2001), A New Two-Stage Scoring Normalization Approach to Speaker Verification, Proc. Int. Sym. on Intelligent Multimedia, Video and Speech Processing, pp. 107-110, Hong Kong.

T. Melluish, C. Suanders, I. Nouretdinov, I and V. Vovk (2001), The Typicalness Framework: A Comparison with the Bayesian Approach. TR, Dept. of Computer Science, Royal Holloway, University of London, http://www.clrc.rhul.ac.uk/tech-report/.

T. Mitchell (1999), The Role of Unlabelled Data in Supervised Learning, Proc. 6th Int. Colloquium on Cognitive Sciences, San Sebastian, Spain.

K. Nigam, A. K. McCallum, S. Thrun and T. M. Mitchell (2000), Text Classification from Labeled and Unlabeled Documents Using EM, Machine Learning, 39 (2/3), 103-134.

S. Pankanti, N. K. Ratha and R. M. Bolle (2002), Structure in Errors: A Case Study in Fingerprint Verification, 16th Int. Conf. on Pattern Recognition, Quebec-City, Canada.

P. J. Phillips, H. Wechsler, J. Huang, and P. Rauss (1998), The FERET Database and Evaluation Procedure for Face Recognition Algorithms, Image and Vision Computing, vol. 16, No. 5, 295-306.

P. J. Phillips, P. Grother, R. J. Michaels, D. M. Blackburn, E. Tabassi and M. Bone (2003), Face Recognition Vendor Test 2002—Overview and Summary.

K. Proedrou, I. Nouretdinov, V. Vovk and A. Gammerman (2001), Transductive Confidence Machines for Pattern Recognition, TR CLRC-TR-01-02, Royal Holloway University of London.

D. A. Reynolds, T. F. Quatieri, and R. B. Dunn (2000), Speaker Verification Using Adapted Gaussian Mixture Models, Digital Signal Processing 10, 19-41.

A. Ross and A. Jain (2004), Information fusion in Biometrics, Pattern Recognition Letters, vol. 24, 2115-2125.

C. Saunders, A. Gammerman, and V. Vovk (1999), Transduction with Confidence and Credibility, 16th Int. Joint Conf. on Artificial Intelligence (IJCAI), Stockholm, Sweden.

R. Snelick, M. Indovina, J. Yen, and A. Mink (2003), Multimodal Biometrics: Issues in Design and Testing, ICMI'03, Vancouver, BC, Canada.

S. Tong and D. Koller (2001), Support Vector Machines Active Learning with Applications to Text Classification, Journal of Machine Learning Research, vol. 2, 45-66.

V. Vovk, A. Gammerman and C. Saunders (1999), Machine-Learning Application of Algorithm Randomness, Proceedings of the1 6th International Conference on Machine Learning, Bled, Slovenia.

W. Zhao, R. Chellappa, P. J. Phillips, and A. Rosenfeld (2003), Face Recognition: A Literature Survey, Computing Surveys, vol. 35, No. 4, 399-458.

* cited by examiner

-- Prior Art --

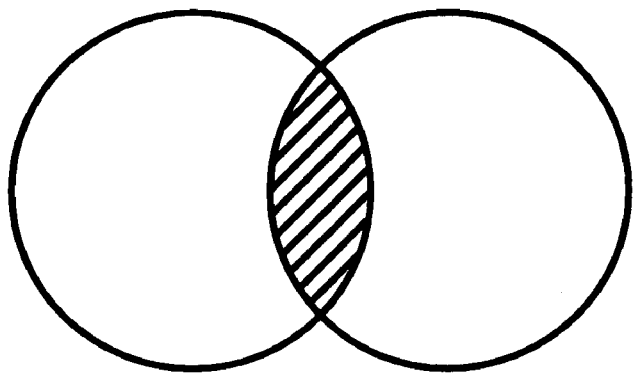
Generic Open Set Task
FIG. 3a
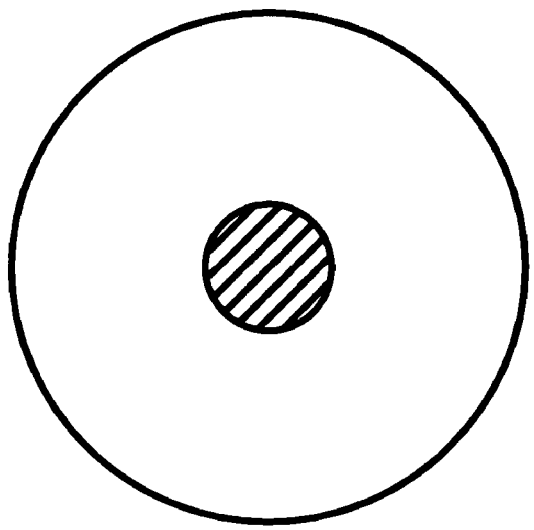
Generic Authentication Task
FIG. 3b
FIG. 3

Table 1

| Watch List Size | Eigenfaces (Mah+L$_2$ distance) | | | Fisherfaces (Cosine distance) | | |
|---|---|---|---|---|---|---|
| | Average Correct Reject | Average Correct Recognition | Accuracy | Average Correct Reject | Average Correct Recognition | Accuracy |
| 10 | 369 03 | 6 68 | 87 37% | 389 16 | 7 93 | 92 35% |
| 15 | 355 67 | 9 82 | 87 02% | 373 86 | 12 39 | 91 96% |
| 20 | 343 81 | 12 43 | 86 89% | 359 92 | 17 04 | 91 94% |
| 25 | 331 4 | 15 09 | 86 62% | 345 11 | 20 60 | 91 43% |
| 30 | 319 5 | 17 79 | 86 48% | 330 70 | 24 93 | 91 18% |
| 35 | 305 43 | 20 42 | 85 75% | 315 15 | 29 04 | 90 58% |
| 40 | 292 97 | 23 19 | 85 45% | 300 95 | 32 99 | 90 25% |

FIG. 10

Table 2

| Watch List Size | Eigenfaces (Mah+L$_2$ distance) | | | Fisherfaces (Cosine distance) | | |
|---|---|---|---|---|---|---|
| | Average Correct Reject | Average Correct Recognition | Accuracy | Average Correct Reject | Average Correct Recognition | Accuracy |
| 10 | 389 74 | 7 64 | 92 41% | 393 08 | 8 48 | 93 62% |
| 15 | 376 28 | 11 72 | 92 38% | 380 24 | 12 16 | 93 43% |
| 20 | 364 18 | 14 12 | 92 27% | 365 28 | 16 16 | 93 03% |
| 25 | 350 24 | 18 26 | 92 13% | 351 84 | 19 56 | 92 85% |
| 30 | 336 94 | 21 62 | 91 94% | 335 72 | 25 52 | 92 63% |
| 35 | 322 96 | 25 22 | 91 63% | 322 28 | 29 36 | 92 54% |
| 40 | 309 24 | 27 98 | 91 14% | 308 64 | 33 28 | 92 41% |

FIG. 11

OPEN SET RECOGNITION USING TRANSDUCTION

CROSS-REFERENCE TO RELATED APPLICATIONS

The present application claims the benefit of provisional patent application Ser. No. 60/623,064 to Li et al., filed on Oct. 29, 2004, which is hereby incorporated by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract N41756-03-C-4026 awarded by the Navy Engineering Logistic Office.

BRIEF SUMMARY OF THE INVENTION

To achieve the foregoing and other advantages, in accordance with all of the invention as embodied and broadly described herein, is an open set recognition system that utilizes transductive inference. One embodiment of this open set recognition system includes capture device(s), a basis, quality checker(s), feature extractor(s), a gallery, a rejection threshold, a storage mechanism, and an open set recognition stage. The capture devices are preferably configured to capture sample(s). Each of the samples may be associated with a sample identifier. The basis is configured to encode at least one of the sample(s) and is derived using representative training samples. The Quality checker(s) may be configured to evaluate the quality of the samples. The feature extractor(s) may be configured to generate signature(s) from sample(s) using the basis. The gallery will usually including at least one gallery sample where each of the gallery sample(s) is a signature. These gallery sample(s) may be stored in a storage mechanism. The rejection threshold may be created using a learning mechanism using at least one of the sample(s) by: swapping the sample identifier with other possible sample identifier(s); computing a credibility p-value for each of the swapped sample identifiers; deriving a peak-to-side ratio using a multitude of the credibility values; and determining the rejection threshold using the peak-to-side ratio distribution. The open set recognition stage is preferably configured to authenticate or reject as unknown the identity of unknown sample(s), by: deriving a set of credibility values by iteratively assign each of the gallery identifiers to the unknown sample and calculating a credibility value; deriving a peak-to-side ratio for the unknown sample using the set of credibility values; comparing the peak-to-side ratio for the unknown sample to the rejection threshold; rejecting the unknown sample as unknown if the peak-to-side ratio is less than or equal to the rejection threshold; and finding the closest of the gallery samples if the peak-to-side ratio is greater than the rejection threshold.

In yet a further aspect of the invention, the step of finding the closest of the gallery sample(s) if the peak-to-side ratio is greater than the rejection threshold includes calculating a credibility value for the closest gallery sample.

In yet a further aspect of the invention, the step of finding the closest of the gallery sample(s) if the peak-to-side ratio is greater than the rejection threshold includes calculating a confidence value for the closest gallery sample.

In yet a further aspect of the invention, the pattern recognition system may further include an error analysis stage configured to identify difficult to recognize samples.

In yet a further aspect of the invention, unknown samples may be categorized with a zoo label to indicate the difficulty involved in identifying unknown samples.

In yet a further aspect of the invention, difficult to recognize samples may be processed using data fusion techniques.

In yet a further aspect of the invention, difficult to recognize samples may be processed using multiple representations.

In yet a further aspect of the invention, at least one of the sample(s) is a biometric sample.

In yet a further aspect of the invention, the basis is used to derive standard PCA and/or Fisherfaces coefficients.

In yet a further aspect of the invention, the basis is pre-derived using the training samples.

In yet a further aspect of the invention, at least one of the capture device(s) is: a still image camera; a video camera; a micro array; or a data acquisition instrument.

In yet a further aspect of the invention, the storage mechanism is used in conjunction with a database.

In yet a further aspect of the invention, the quality checker calculates an intraocular distance and verifies the intraocular distance is within a predetermined range.

In yet a further aspect of the invention, the quality checker calculates a signal to noise ratio.

In yet a further aspect of the invention, the quality checker looks for the presence of facial landmarks such as eyes, a nose and a mouth.

In yet a further aspect of the invention, at least one of the sample(s) is an image of a face.

In yet a further aspect of the invention, at least one sample or unknown test probe is a multitude of samples and the one gallery sample (class) is a multitude of gallery samples (i.e. clouds of samples such as multitude of still frames, video clips, etc.)

In yet a further aspect of the invention, the pattern recognition system is used for video matching or used by a visual search engine.

In yet a further aspect of the invention, feature selection for enhanced pattern recognition is achieved using strangeness and the p-value function. the stranger the feature values are the better the discrimination between the patterns.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 3 is a diagram showing generic open set and watch list tasks.

FIG. 10 is a table showing mean performance of open set {PCA, Fisherfaces} for different watch list sizes.

FIG. 11 is a table showing the average performance of Open Set TCM-kNN for different watch list sizes.

DETAILED DESCRIPTION OF THE INVENTION

Figure 1A:
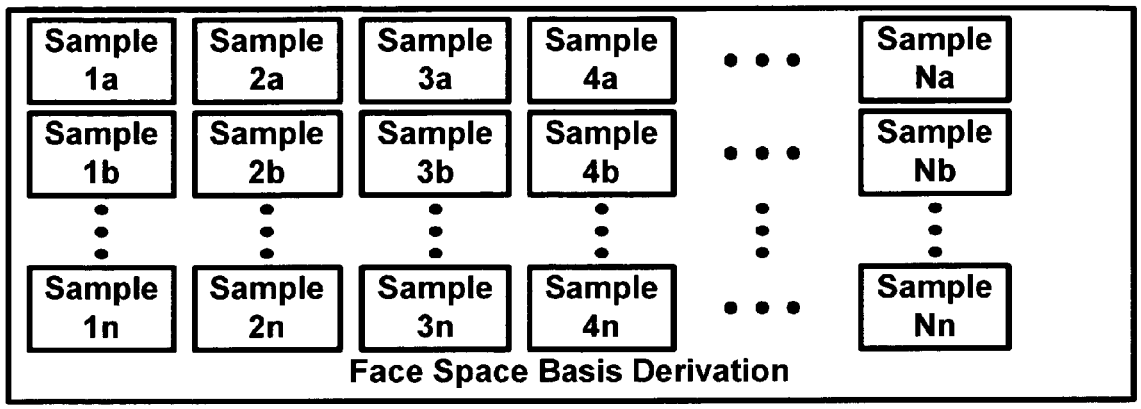
FIG. 1 shows a generic biometric system.
Figure 1B:
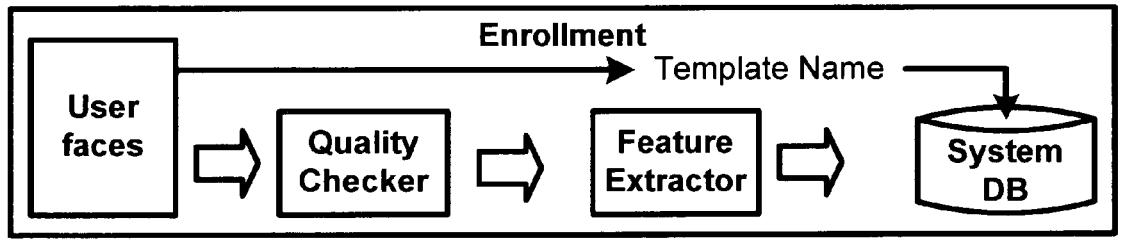
Figure 1C:
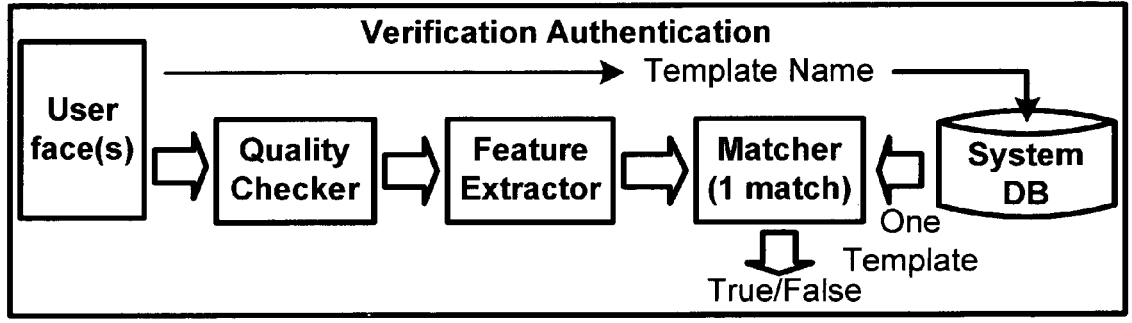
Figure 1D:
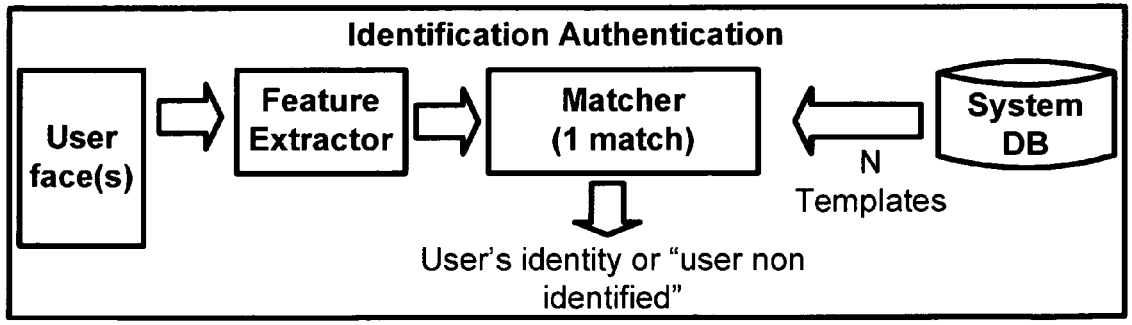

The present invention is an open set recognition system that utilizes transductive inference. Open set recognition systems operate under the assumption that not all test probes have mates in a gallery. Although the present system is described in terms of a face recognition application, one skilled in the art will recognize that the present open set recognition system is capable of operating on other types of data (both simple and complex) such as DNA gene matching or fractal pattern matching. The system either detects the presence of a signature (possibly biometric) within the gallery and finds its identity or rejects it. In other words, the system provides for the case where the correct answer for a possible match is "none of the above."

This disclosure describes Open Set TCM-kNN (Transduction Confidence Machine-k Nearest Neighbors), a realization of transductive inference made suitable for multi-class authentication and field operation. Open Set TCM-kNN, driven by the relation between transduction and Kolmogorov complexity, provides a local estimation of a likelihood ratio needed for detection tasks. Experimental data has shown the feasibility, robustness, and comparative advantages of Open Set TCM-kNN on Open Set identification and watch list (surveillance) tasks using challenging FERET data. FERET data may be obtained from the FERET database, which contains 14,126 facial images of 1199 individuals. Copies of the FERET database, which was originally developed at George Mason University for the Department of Defense Counterdrug Technology Development Program Office, may be obtained from the National Institute of Standards and Technology (NIST) in Gaithersburg, Md.

Analysis of the error structure (driven by the fact that most of the errors in identification are due to a relatively small number of face patterns), has shown that the Open Set TCM-kNN was suitable for PSEI (pattern specific error inhomogeneities) error analysis to identify difficult to recognize faces. PSEI analysis improves biometric performance by handling a small numbers of difficult to recognize faces responsible for much of the original error in performance using data fusion or additional biometric/forensic information.

Throughout this disclosure, references are made to a series of publications by author and year. These references are listed in a reference section near the end of this "Detailed Description of the Invention" section. The purpose of each of these references is to provide background information for statements made.

Face recognition is a major biometric technology (Chellappa et al., 1995; Daugman, 1997; Jain et al., 1999; Zhao et al., 2003; Bolle et al., 2004; Liu and Wechsler, 2004). A major challenge for face recognition technologies is a generic open set recognition problem which operates under the assumption that not all the probes (unknown test face images) have mates (counterparts) in a gallery (of known subjects). It is advantageous that face recognition systems have the a priori availability of a reject option to determine that a probe does not match any of the known subjects (i.e. the system is capable of responding to a match analysis with a "none of the above" answer). If a probe is detected rather than rejected, the face recognition engine will then preferably identify/recognize the subject. The operational analogue for open set face recognition is the (usually small) Watch List or Surveillance task, which involves (i) negative identification ("rejection") due to the obvious fact that the large majority [almost all] of the people screened at security entry points are law abiding people, and (ii) correct identification for those that make up the watch list.

Transduction, the (non-inductive) inference methodology disclosed, which addresses the challenges characteristic of the open set face recognition problem, is a type of local inference that moves from particular to particular (Vapnik, 1998). This methodology addresses a small sample size problem that affects face recognition due to a lack of enough data for training and/or testing. Transductive inference, in analogy to learning from unlabeled exemplars (Mitchell, 1999), is directly related to a case when one has to classify some (unknown) test (probe) face images and the choice is among several (tentative) classifications, each of them leading to different (re)partitionings of the original ID (entity) face space.

As indicated earlier, the disclosed Open Set TCM-kNN (Transduction Confidence Machine-k Nearest Neighbors), which is a realization of transductive inference, may also be suitable for multi-class classification. Open Set TCM-kNN, driven by the relation between transduction and Kolmogorov complexity, provides a local estimation of the likelihood ratio required for detection tasks. Experimentation has shown the feasibility, robustness, and comparative advantages of Open Set TCM-kNN using challenging FERET data.

Face Recognition Tasks and Performance Evaluation Protocols

FIG. 1 shows a generic (on-line) biometric system. The match component(s) compare biometric information extracted from sample face exemplar(s) and signature(s) stored in reference (signature) template(s). One may then compare an output score with a predefined rejection threshold value to determine if the unknown probe is known/familiar; matching proceeds if the unknown probe is familiar. The comparison may be against a single template (for verification) as shown in FIG. 1c, or against a list of candidate templates (for identification) as shown in FIG. 1d. The face space, i.e., the basis needed to generate the templates, may be derived using face image samples acquired ahead of time and independent of those that would be enrolled or tested later on (see FIG. 1a).

FERET (Phillips et al., 1998) and BANCA (Bailly-Bailliere et al., 2003), are two standard evaluation protocols in use today. FERET undertakes only an algorithmic (technology) evaluation. It works by considering target (gallery) T and query (probe) Q sets. The output for FERET is a full (distance) matrix S (q, t), which measures the similarity between each query, $q \in Q$, and each target, $t \in T$, pair. The nearest neighbor (NN) classifier may then authenticate face images using similarity scores recorded by matrix S. The availability of the matrix S allows for different "virtual" experiments to be conducted when one selects specific query P and gallery G as subsets of Q and T.

The 1:N open set problem referred to by FRVT2002 (Phillips et al., 2003) as the watch list task, is briefly addressed by FRVT2002 after the two (degenerate) special cases of verification and closed set identification. Verification corresponds to an open set identification for a gallery size of N=1, while closed set identification seeks the match for an image whose mate is known to be in the gallery, i.e., for each image probe p∈P there exists (exactly one) gallery mate g*∈G. Cumulative Matching Curves (CMC) and Receiver Operating Characteristics (ROC), used to display both closed and open set, may be derived for different thresholds but using ground truth, which would not be available during field operation.

The closed universe model for 1:N identification is quite restrictive as it does not reflect the intricacies for the actual real positive and negative identification scenarios. Under positive claim of identity, the user claims to be enrolled in or to be on the watch list, while under negative claim of identity, the user claims not to be enrolled or known to the system. "Performance for the open set problem is quantified over two populations. The first population is the impostors, those persons who are not present in the gallery, i.e., not on the watch list, are used to compute the false match [acceptance] rate, which is needed to quantify rejection capability. The second population includes those persons who are "known" (i.e., previously enrolled) to a system, the open set identification rate, is used to quantify user [hit] performance" (Grother, 2004).

The BANCA protocol is geared toward the verification task and is designed to work with multi-modal databases. Verification is viewed as hypothesis testing and the (detection) choice is between true clients and impostors. There are two types of errors: false acceptance and false rejection, and their associated costs. Two types of protocols may exist, closed and open set, respectively. In closed set verification, the population of clients is generally fixed and anyone not in the training set may be considered an impostor. An example of closed set verification protocol is the earlier Lausanne [XM2VTS]. (Bengio et al., 2001).

In open set verification, one seeks to add clients without having to redesign the verification system. In particular, the BANCA protocol wants to use the same feature space and the same design parameters including thresholds. In such a scenario, the feature space and the verification system parameters may be trained using calibration data completely distinct and independent from the data used for specifying the client models. The BANCA protocol is an example of open set verification protocol.

The use of the open set concept by the BANCA protocol is quite restricted. It only refers to the derivation of the feature (face) space and the parameters needed for verification. This was referred to earlier as face space basis derivation (see top of FIG. 1a). The BANCA protocol, however, does not address the full scope of open set identification, where some probes are not mated in the gallery.

Transduction

Figure 2:
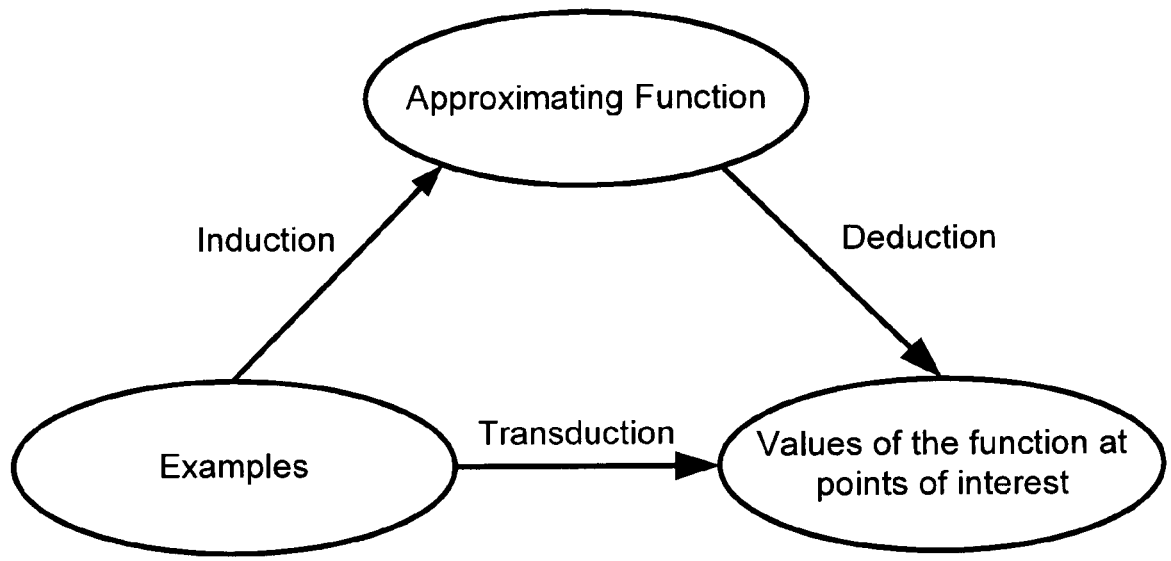
FIG. 2 is a diagram showing transduction.

FIG. 2 is diagram which shows Transduction. Transductive inference is a type of local inference that moves from particular to particular. (Vapnik, 1998; 2000). "In contrast to inductive inference where one uses given empirical data to find the approximation of a functional dependency (the inductive step [that moves from particular to general]) and then uses the obtained approximation to evaluate the values of a function at the points of interest (the deductive step [that moves from general to particular]), one estimates [using transduction] the values of a function [only] at the points of interest in one step" (Vapnik, 1998). A simple mathematical method for transductive inference is a method of k nearest neighbors. The Cover-Hart (1967) theorem proves that asymptotically the one nearest neighbor algorithm is bounded above by twice the Bayes minimum probability of error.

Vapnik (1998) approaches transductive inference as follows. Given training (labeled) exemplars one seeks among feasible labelings of the (unlabeled probe) test exemplars the one that makes the error observed during testing (labeling) consistent with the error recorded during training. It is also assumed that the training and test exemplars are i.i.d (identically independent distributed) according to some [common] distribution function. Vapnik (1998) then defines the overall risk functional using two equivalent settings with the explicit goal of minimizing them.

Setting #1 says "Given a small sample size set of training sample exemplars, T, which consists of l pairs $(x_i, y_i)$, estimate the value of the function $y=\Phi(x)$ at the given [working test probe sample exemplars] set W of points $x_{l+1}, \ldots, x_{l+m}$. (Size l is considered to be small if the ratio l/h is small, say l/h<20, where h is the VC-dimension of the set). Based on the training set T, the working set W, and on a given set of functions $f(x,\alpha)$, $\alpha \in \Lambda[\Phi(x)$ does not necessarily belong to this set], find $f(x,\alpha^*)$ that minimizes with a preassigned probability 1−η the overall risk of forecasting the values of the function $y_i=\Phi(x_i)$ on the elements of the working set W—that is, which yields with probability 1−η a value of the functional $$R(\alpha) = \frac{1}{m}\sum_{i=1}^{m} \rho(y_{l+i}, f(x_{l+i}, \alpha)) \tag{1}$$

close to the minimal one. $\rho(y, f(x, \alpha))$ is some measure of discrepancy between y and $f(x, \alpha)$, say $$\rho(y_{l+i}, f(x_{l+i}, \alpha)) = (y_{l+i} - f(x_{l+i}, \alpha))^2 \tag{2}$$

Setting #1 seeks to minimize the deviation between the risk on the training and working samples.

Setting #2 considers training and working samples [chosen according to a probability distribution function P(x, y)], and seeks an algorithm A that will choose a function $f(x,\alpha_A)$, $$f(x,\alpha_A) = f(x,\alpha_A(x_1,y_1; \ldots ;x_l,y_l;x_{l+1}, \ldots, x_{l+m})) \tag{3}$$

that yields the value of the functional $$R(A) = \int \left( \frac{1}{m}\sum_{i=l+1}^{l+m} \rho(y_i, f(x_i, \alpha_A)) \right) dP(x_1, \tag{4}$$

$$y_1) \ldots dP(x_l, y_l) dP(x_{l+1}, \ldots, x_{l+m})$$

close to the minimal one, when the sum Σ is indexed for (unlabeled) exemplars i between l+1 and l+m. Setting #2 labels W, the working exemplars set, in a fashion consistent with T, the training set, e.g., using minimization for some error functional over T∪W. One possible realization using SVM (support vector machines) is to classify the joint set of training and working exemplars with maximal margin over all possible classifications L(W) for the working set W, e.g., arg $\min_{L(W)} \min_w \frac{1}{2}\|w\|^2$ (See Saunders et al., 1999).

The solutions for Settings #1 and #2 are connected (Theorem 8.1) (Vapnik, 1998). An example is TSVM (Transductive inference using SVM), which has been shown to yield substantial improvements for text classification, a two-class classification task, over inductive methods, especially for small training sets and large test (working) sets. The observed success was explained due to the fact that "the margin of separating hyperplanes is a natural way to encode prior knowledge for (text) classifiers and to study the location of text exemplars (with respect to the hyperplane), which is not possible for an inductive learner" (Joachims, 1999).

The goal for inductive learning is to generalize for any future test set, while the goal for transductive inference is to make predictions for a specific working set. The working exemplars provide additional information about the distribution of data and their explicit inclusion in the problem formulation yields better generalization on problems with insufficient labeled points (Gammerman et al., 1998). Transductive inference becomes suitable for face recognition when some of the faces available for training lack proper ID (entification) or when one has to classify some (unknown) test face image (s). A challenge is to choose among several (tentative) classifications, each of them leading to different partitionings of the ID (entity) face space. The scope for transducive inference is augmented herein in order to cope with the open set recognition problem, which requires (a) detection in addition to mere identification; and (b) the ability to cope with multi-class rather than two-class classification. The solution to this problem is presented in the next two sections.

Kolmogorov Complexity and Randomness Deficiency

There is a strong connection between transductive inference and Kolmogorov complexity. Let #(z) be the length of the binary string z and K(z) its Kolmogorov complexity, which is the length of the smallest program (up to an additive constant) that a Universal Turing Machine needs as input in order to output z. The randomness deficiency D(z) for string z (Li and Vitanyi, 1997; Vovk et al., 1999) is $$D(z) = \#(z) - K(z) \qquad (5)$$

and it measures the randomness of the binary string z and the set it represents. The larger the randomness deficiency, the more regular and more probable the string z is (Vovk et al., 1999). [Another connection between Kolmogorov complexity and randomness is via MDL (minimum description length).] Transductive inference seeks to find from all possible labelings L(W) the one that yields the largest randomness deficiency, i.e., the most probable labeling. This choice models the working ("test") exemplar set W in a most similar fashion to the training set T and would thus minimally change the original model for T or expand it for T∪W (see Sect. 3 for the corresponding transductive settings). "The difference between the classifications that induction and transduction yield for some working exemplar approximates its randomness deficiency. The intuitive explanation is that we disturb a classifier (driven by T) by inserting a new working examplar in a training set. A magnitude of this disturbance is an estimation of the classifier's instability (unreliability) in a given region of its problem space" (Kukar and Kononenko, 2002).

Randomness deficiency is, however, may not be computable (Li and Vitanyi, 1997). One may approximate it instead using a slightly modified Martin-Löf test for randomness and cal the values taken by such randomness tests p-values. The p-value construction used here has been proposed by Gammerman et al. (1998) and Proedrou et al. (2001). Given a sequence of distances from exemplar i to other exemplars, the strangeness of i with putative label y is defined as:

$$\alpha_i = \left(\sum_{j=1}^{k} d_{ij}^y\right)\left(\sum_{j=1}^{k} d_{ij}^{-y}\right)^{-1} \qquad (6)$$

The strangeness measure $\alpha_i$ is the ratio of the sum of the k nearest distances d from the same class (y) divided by the sum of the k nearest distances from all the other classes (-y). The strangeness of an exemplar increases when the distance from the exemplars of the same class becomes larger and when the distance from the other classes becomes smaller. The smaller the strangeness the larger its randomness deficiency is. Note that each new test exemplar e with putative label y and derived strangeness $\alpha_{new}^y$ may require the recomputation of the strangeness for all the training exemplars when the identity of their k nearest neighbors exemplars changes due to the location of (the just inserted new exemplar) e.

The p-value construction shown below, where l is the cardinality of the training set T, constitutes a valid randomness (deficiency) test approximation (Melluish et al., 2001) for this tranductive (putative label y) hypothesis. Note that $\alpha_i$ in equation (7) includes the recomputed strangeness, if needed, for all the training exemplars and $\alpha_{new}^y$ $$p_y(e) = \frac{\#\{i : \alpha_i \geq \alpha_{new}^y\}}{l+1} \qquad (7)$$

An alternative valid randomness (deficiency) approximation (Vovk et al., 1999) and the one that we use defines the p-value for a working exemplar e (with putative label y) as:

$$p_y(e) = \frac{f(\alpha_1) + f(\alpha_2) + \ldots + f(\alpha_l) + f(\alpha_{new}^y)}{(l+1)f(\alpha_{new}^y)} \qquad (8)$$

where the function f used is a monotonic non-decreasing function with f(0)=0, f(α)=α, and l is the number of training exemplars. Empirical evidence has shown that the randomness approximation (8) yields better performance than the standard one (7), which may suffer from "distortion phenomenon" (Vovk et al., 1999). If there are c classes in the training data, there are c p-values for each working exemplar e. Using p-values one chooses that particular labeling driven by the largest randomness deficiency for class membership, i.e., the putative label y that yields the least strangeness or correspondingly the largest p-value. This largest p-value may also be defined as the credibility of the label chosen, which is a measure of information quality. The associated confidence measure, which is derived as the 1st largest p-value (or one) minus the 2nd largest p-value, indicates how close the first two assignments are. The confidence value indicates how improbable classifications other than the predicted labeling are, while the credibility value shows how suitable the training set is for the classification of that working exemplar.

The transductive inference approach uses the whole training set T to infer a rule for each new exemplar. Based on the p-values defined above, Proedrou et al. (2001) have proposed the TCM-kNN (Transduction Confidence Machine—k Nearest Neighbor) to serve as a formal transduction inference algorithm for classification purposes. TCM-kNN has access to a distance function d that measures the similarity between any two exemplars. Different similarity measures (see Sect.

6) are used and their relative performance varies accordingly. TCM-kNN does not address, however, the detection (decision) aspect needed for open set face recognition. The present invention uses the PSR (peak-side-ratio) that characterizes the distribution of p-values to solve the detection aspect. It implements the equivalent of the likelihood ratio (LR) used in detection theory and hypothesis testing, where LR is the ratio between the hypothesis $H_0$ that the unknown probe belongs to the gallery and $H_1$ (alternative hypothesis) that it does not belong.

The distribution for the PSR, if impostor cases were made available, serves to determine how to threshold in order to accept or reject a particular working exemplar e. Towards that end, the training exemplars may be relabeled, one at a time, with all putative labels except the one originally assigned to it. The corresponding PSR should resolve each such relabeled exemplar suitable for rejection because its new label is mistaken. The resulting distribution for the PSR determines then when to reject working exemplars as impostors. Open Set TCM-kNN implements the above concepts and it is described in the next section.

Open Set TCM-kNN

Open Set recognition operates under the assumption that not all the probes have mates in the gallery and it thus requires a reject option. Given a new (test/probe) working exemplar e, the p-values output from Open Set TCM-kNN records the likelihoods that the new exemplar comes from each putative subject in the training data. If some p-value is high enough and it significantly outscores the others, the new exemplar may be mated to the corresponding subject ID with credibility p. If the top ranked (highest p-values) choices are very close to each other and outscore the other choices, the top choice can still be accepted but its recognition is questionable due to ambiguity and yields low confidence. The confidence measures the difference between the 1st and 2nd largest (or consecutive) p-values. If all p-values are randomly distributed and no p-values outscore other p-values enough, any recognition choice will be questionable and the new exemplar should be rejected. The proposed PSR (peak-to-side ratio)

$$PSR = (p_{max} - p_{mean})/p_{stdev} \quad (9)$$

characterizes those characteristics of p-value distribution, where $p_{mean}$ and $p_{stdev}$ are the mean and standard deviation of the p-value distribution without $p_{max}$.

The threshold for rejection may be learned a priori from the composition and structure of the training data set at enrollment time. Each training exemplar e may be iteratively reassigned to all possible classes but different from its own and the p-values may be recomputed accordingly. The PSR may be derived using the recomputed p-values with e playing the role of an impostor. The PSR values found for such impostors are generally low (since they do not mate) compared to those derived before for legitimate subjects and so they may require rejection. The PSR distribution (and its tail) provides a robust method for deriving a priori the operational threshold $\Theta$ for detection as $$\Theta = PSR_{mean} + 3 \times PSR_{stdev} \quad (10)$$

where $PSR_{mean}$ and $PSR_{stdev}$ (standard deviation) are characteristic for the PSR distribution. The probe may then be rejected if the relationship $PSR_{new} \leq \Theta$ holds true. Correspondingly, authentication may take place for (large) values exceeding $\Theta$.

There are conceptual similarities between the use of the PSR to approximate the likelihood ratio and scoring normalization methods used in speaker verification (Furui, 1997; Reynolds et al., 2000). The alternative hypothesis for speech may be modeled using the cohort or the universal background model (UBM). The cohort approximates the alternative $H_1$ hypothesis using speech-specific (same gender impostor) subjects, while UBM models $H_1$ by. pooling speech from several speakers and training a single speaker background model. The PSR measure is conceptually related to the cohort model, as both implement LR using local estimation for the alternative hypothesis. The ability of the cohort model to discriminate the speaker's speech from those of similar, same gender impostors is much better than that offered by UBM (Mak et al., 2001) and it may lead to improved security at lower FAR (false acceptance rates). Similar arguments hold for other modalities, including human faces.

Experimental Design

A data set from FERET (Phillips et al., 1998) consisting of 750 frontal face images corresponding to 250 subjects was used in experiments evaluating the present invention. Two-hundred subjects came from a difficult batch (#15) that was acquired using variable illumination and/or facial expressions, while the remaining different 50 subjects were drawn from other batches. Each subject had three normalized (zero mean and unit variance) images of size 150×150 with 256 gray scale levels. The normalized 300 face images from 100 subjects were used to generate PCA (Principal Component Analysis) and FLD (Fisher Linear Discriminant) face basis (see top of FIG. 1). Fifty subjects were randomly selected from batch #15 and the remaining different 50 subjects were drawn from other batches. The remaining 450 face images for 150 subjects were used for enrollment and testing. They were projected on the PCA and FLD face bases derived ahead of time to yield 300 PCA coefficients and 100 Fisherfaces using FLD on the reduced 300 PCA space (Liu and Wechsler, 2002). For each subject, two images were randomly selected as training and the third one as testing.

Several well-known similarity measures were used (see below) to evaluate their effect on different face representation (PCA and Fisherfaces) when using TCM-kNN (k=1). The similarity distances d used are shown next. Given two n-dimensional vectors $X, Y \in R^n$, the distance measures used may be defined as follows:

$$d_{L1}(X, Y) = |X - Y| = \sum_{i=1}^{n} |X_i - Y_i|$$

$$d_{L2}(X, Y) = \|X - Y\|^2 = (X - Y)^T(X - Y)$$

$$d_{cos}(X, Y) = -\frac{X^T Y}{\|X\|\|Y\|}$$

$$d_{Dice}(X, Y) = -\frac{2 X^T Y}{\|X\|^2 + \|Y\|^2} = -\frac{2 X^T Y}{X^T X + Y^T Y}$$

$$d_{Jaccard}(X, Y) = \frac{X^T Y}{\|X\|^2 + \|Y\|^2 - X^T Y} = -\frac{X^T Y}{X^T X + Y^T Y - X^T Y}$$

$$d_{Mah+L2}(X, Y) = (X - Y)^T \sum\nolimits^{-1} (X - Y)$$

$$d_{Mah+cos}(X, Y) = -\frac{X^T \sum\nolimits^{-1} Y}{\|X\|\|Y\|}$$

where $\Sigma$ is the scatter matrix of the training data. For PCA, $\Sigma$ is diagonal and the diagonal elements are the (eigenvalues) variances of the corresponding components. The Mahalanobis+$L_1$ distance defined only for PCA is $$d_{Mah+L1}(X, Y) = \sum_{i=1}^{n} \left( \frac{|X_i - Y_i|}{\sqrt{\lambda_i}} \right)$$

$L_1$ defines the city-block distance, $L_2$ defines the Euclidean distance. Cosine, Dice, Overlap and Jaccard measure the relative overlay between two vectors. $L_1$, $L_2$ and cosine can also be weighted by the covariance matrix of training data, which leads to Mahalanobis related distances. The empirical findings indicate that Mahalanobis related similarity distances are superior to others when expressive features (driven by PCA) are used; while overlay related similarity distances are superior when discriminating (Fisherfaces) features are used.

The next two sections present experimental data that illustrates the usefulness and robustness of Open Set TCM-kNN for (generic) open set face recognition and watch list tasks (see FIGS. 3a and 3b, respectively). Watch list, a special task for open set face recognition, corresponds to the case when the overlap between the gallery and probe sets is the gallery (watch list) itself and the probe set size is much larger than the gallery. Open set and watch list can be thought operationally relevant to the US-VISIT program where applicants are matched against large data bases to possibly avoid repeat visa applications, while watch list corresponds to the case where subjects are matched for negative identification against some WANTED list.

Open Set Face Recognition

Biometric systems in general, and face recognition engines, in particular, generally require significant tuning and calibration, for setting the detection thresholds among other things, before "plug and play." Setting thresholds is not easy to automate due to their strong dependency on image quality and the composition of training data. Note also that "much more is known about the population, [or genuine customers,] of an application than is known about the enemies, [i.e., the imposters that have to be rejected]. Consequently, the probability of a false alarm rate (FAR), a false match [for screening and positive identification], is hard to estimate. Hence, the false reject rate (FRR), that concerns open set negative identification, is easier to estimate than the false alarm rate, because the biometric samples of the enemy population are not available" (Bolle et al., 2004). The thresholds needed for field deployment normally have to be set up ahead of time, i.e., a priori, and without resorting to additional client, e.g., impostor data. The alternative of setting the thresholds a posteriori using the ground truth available from the aggregate similarity scores recorded for matching the probe set against the gallery set is not appropriate because the ground truth is not available.

Conventional threshold selection methods typically compute the distribution of inter- and intra ID (subject) distances, and then choose a threshold to equalize the overlapping areas of the distributions, i.e., to equalize the false acceptance rate (FAR) and false rejection rate (FRR). "The success of this approach, however, relies on whether the estimated distributions match the subject- and impostor-class distributions. Session-to-session ID variability, however, contributes much bias to the thresholds, rendering the authentication system unstable" (Bengio et al., 2001).

Comparative performance of Open Set TCM-kNN against Open Set {PCA, Fisherfaces}, the corresponding versions for PCA and Fisherfaces, which are standard and well known face recognition methods, is discussed next. The face space basis derivation is done before enrollment (see FIG. 1), the corresponding data collection was described in the "Open Set TCM-kNN" section, and nearest neighbor identification is done using the distances described in the previous section. Detection thresholds for Open Set TCM-kNN are found as described in the "Open Set TCM-kNN" section, while detection thresholds for Open Set {PCA and Fisherfaces} are found as explained next.

The Open Set standard PCA ("Eigenfaces") and Fisherfaces classifiers derive their rejection threshold from the intra- and inter-distance (similarity) distribution of training exemplars in a fashion similar to that used by FRVT2002. The statistics of intra-distance ("within") distribution set the lower bound of the threshold and the statistics of inter-distance ("between") distribution set the upper bound. As the minimum distance of the new (test/probe) exemplar to the prototypes for each class becomes closer to or larger than the upper bound, the more likely the new testing exemplar will be rejected. Experiments have shown that face recognition performance varies according to the threshold chosen.

The recognition rate reported is the percentage of subjects whose probe is correctly recognized or rejected. Faces were represented using either 300 PCA or 100 Fisherfaces components. From the 150 subjects available (see Sect. 6), 80 subjects were randomly selected to form a fixed gallery, while another 80 subjects were randomly selected as probes such that 40 of them have mates in the gallery, i.e., the gallery and probe sets have an overlap of 40 subjects. The gallery consisted of two (out of 3) randomly selected images; while the probes consisted of the remaining one (out of 3) images for faces that belong to the gallery and one (out of 3) randomly selected image for subjects that do not belong to the gallery. During testing, all distance measurements from the "Experimental Design" were used and the threshold varied from lower to upper bound. The same experiment was run 100 times for different probe sets. The distance measurements d for Open Set {PCA and Fisherfaces} that yielded the best results were Mahalanobis+L2 and cosine, respectively. FIG. 4 shows the mean recognition rate for different thresholds. When ground truth was available the thresholds $\Theta$ were optimally set to yield maximum performance, and the reject decision was taken if (min) d>$\Theta$ reject. The best average (over 100 experiments) authentication (correct rejection and identification) rates (see FIG. 4) for Open Set {PCA, Fisherfaces} classifiers that yield FAR=7% were:

74.3% (s.d.=3.06%) for PCA representation and sometime the optimal $\Theta \sim (\text{Intra}_{mean} \times \text{Intra}_{stdev} + \text{Inter}_{mean} \times \text{Inter}_{stdev})/(\text{Inter}_{stdev} + \text{Intra}_{stdev})$ 85.4% (s.d.=2.30%) for Fisherfaces representation and sometime the optimal $\Theta \sim (\text{Intra}_{mean} \times \text{Inter}_{stdev} + \text{Inter}_{mean} \times \text{Intra}_{stdev})/(\text{Inter}_{stdev} + \text{Intra}_{stdev})$.

Figure 4A:
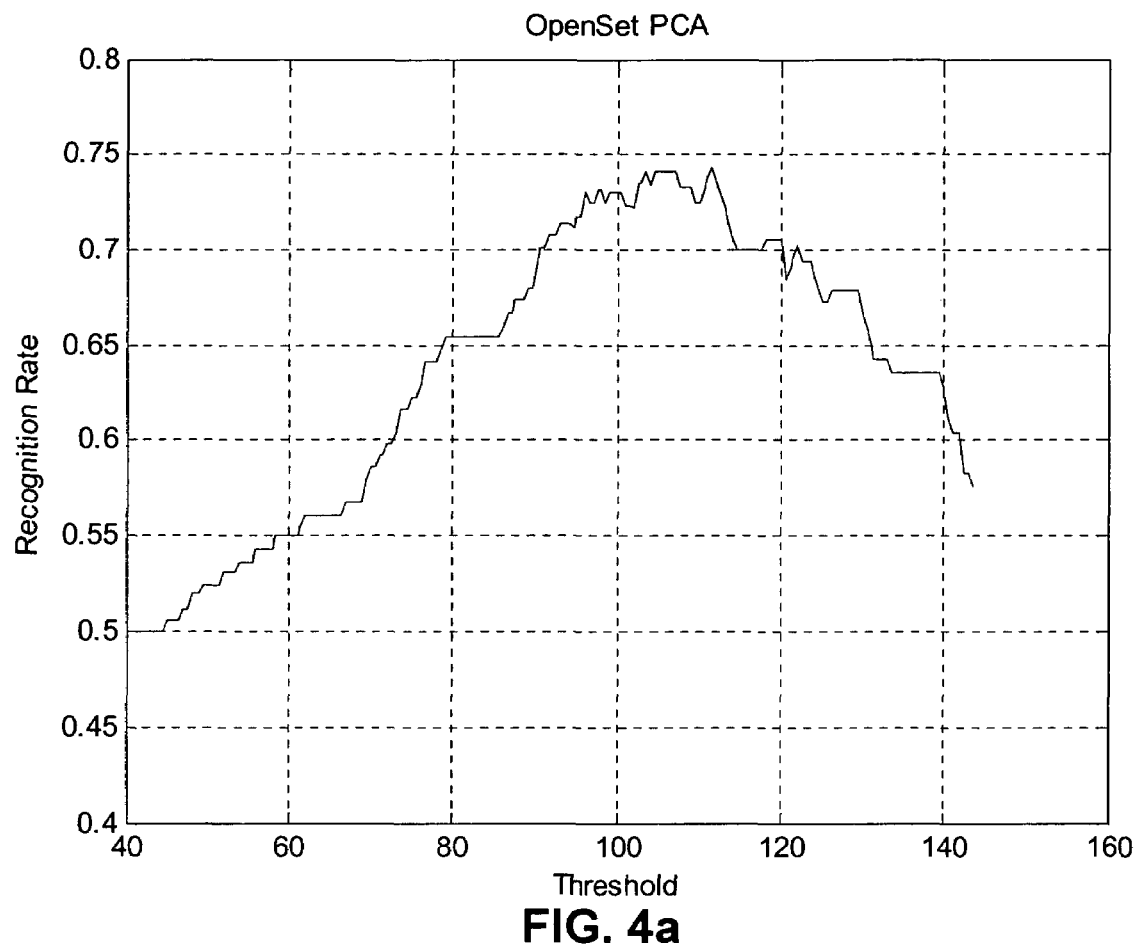
FIG. 4a shows a graph of the recognition rate vs Threshold: PCA.
Figure 4B:
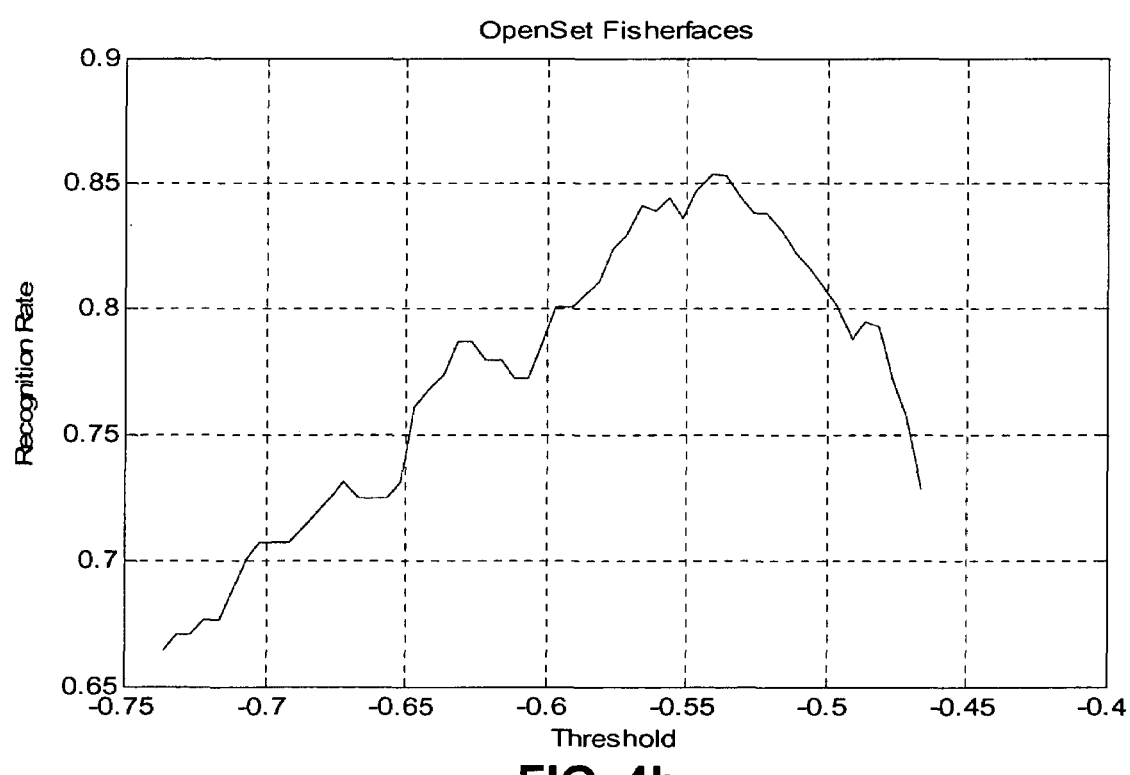
FIG. 4b shows a graph of the recognition rate vs Fisherfaces.

FIG. 4a shows a graph of The Recognition Rate vs Threshold: PCA, and FIG. 4b shows a graph of The Recognition Rate vs Fisherfaces.

For Open Set PCA, the results are very close if the number of components used varies from 150 to 300, while for Open Set Fisherfaces, the results are very close if the number of components used varies from 55 to 90. More experiments have been done randomly varying the gallery set and similar results were obtained. The optimal threshold, however, varies largely with the gallery set and probe, and would be hard to be determined a priori. Attempts made to learn the threshold a priori, i.e., without ground truth knowledge were unsuccessful.

Figure 5A:
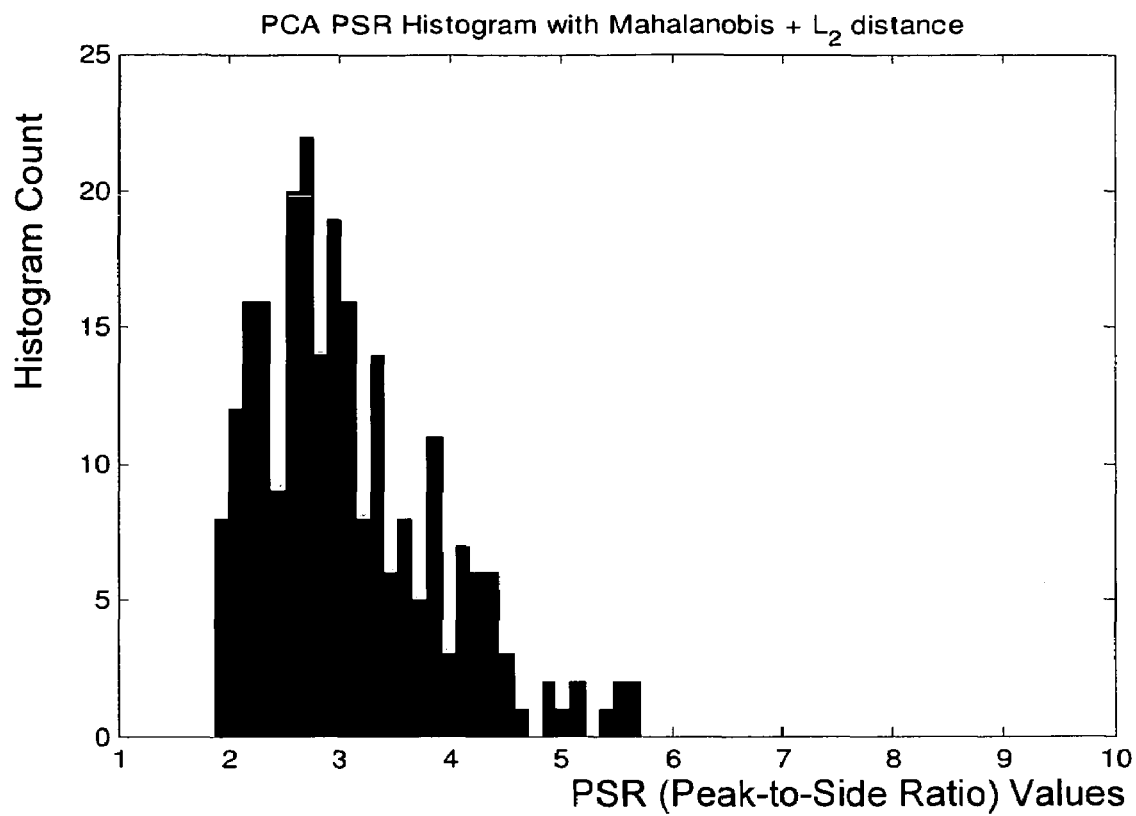
FIG. 5a shows a PSR histogram for PCA components.
Figure 5B:
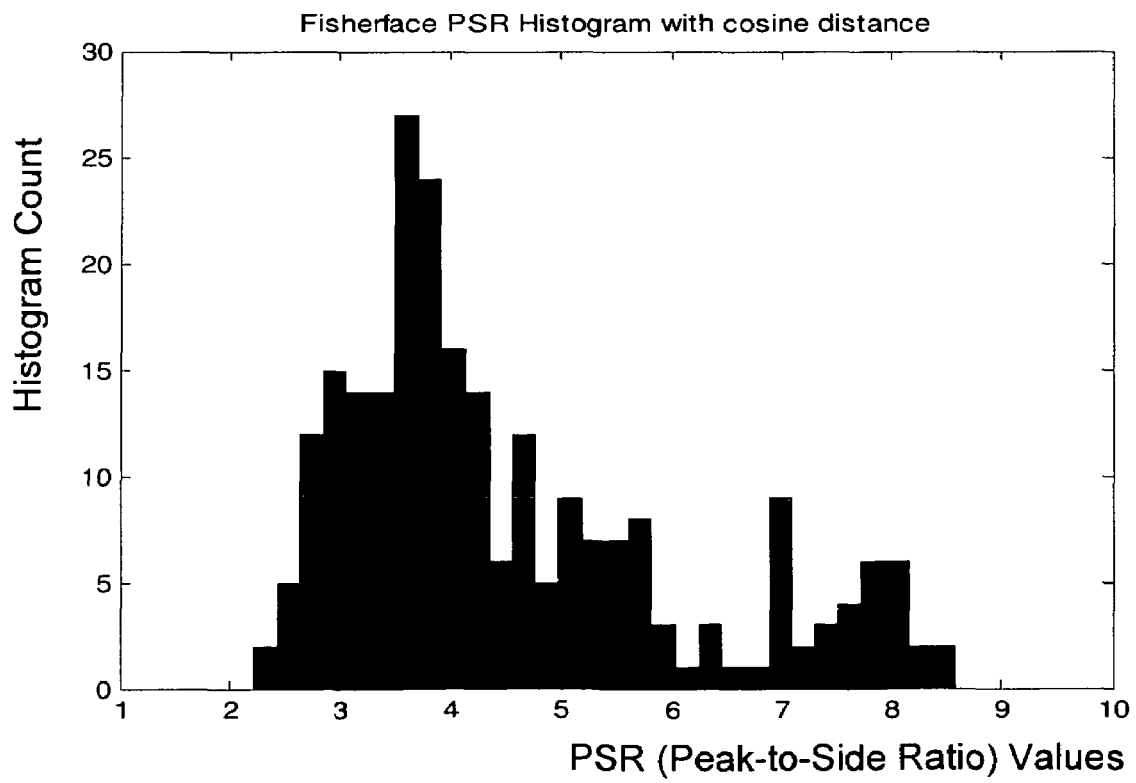
FIG. 5b shows a PSR histogram for Fisherface components.

The same Open Set experiment was then run using Open Set TCM-kNN for k=1. The only difference now is that the rejection threshold Θ for rejection was computed a priori, and according to the PSR procedure described in the "Open Set TCM-kNN" section (see FIG. 5) Authentication is driven by large PSR and the average authentication (correct rejection and identification) rates for FAR=6% are:

81.2% (s.d.=3.1%) for PCA using Θ=5.51 and the Mahalanobis+$L_2$ distance;

88.5% (s.d.=2.6%) for Fisherfaces using Θ=9.19 and the cosine distance.

Using PCA, the results for Open Set TCM-kNN are very close if the number of components used varies from 170 to 300, while using Fisherfaces the results for Open Set TCM-kNN are very close if the number of components used varies from 55 to 80. More experiments have been done randomly varying the gallery set and similar results were obtained. The threshold varied with the chosen gallery set and was determined a priori. This is different from Open Set {PCA, Fisherfaces} where the performance shown was obtained only if the thresholds were optimally set a posteriori using ground truth. Keeping this significant difference in mind, Open Set TCM-kNN outperforms the Open Set {PCA, Fisherface} classifiers. Attempts to set the thresholds ahead of time ("a priori") for the Open Set {PCA, Fisherfaces} classifiers were not successful, because the intra- and inter-distance distributions for the gallery were not too powerful to characterize the behavior of the probe.

Figure 6:
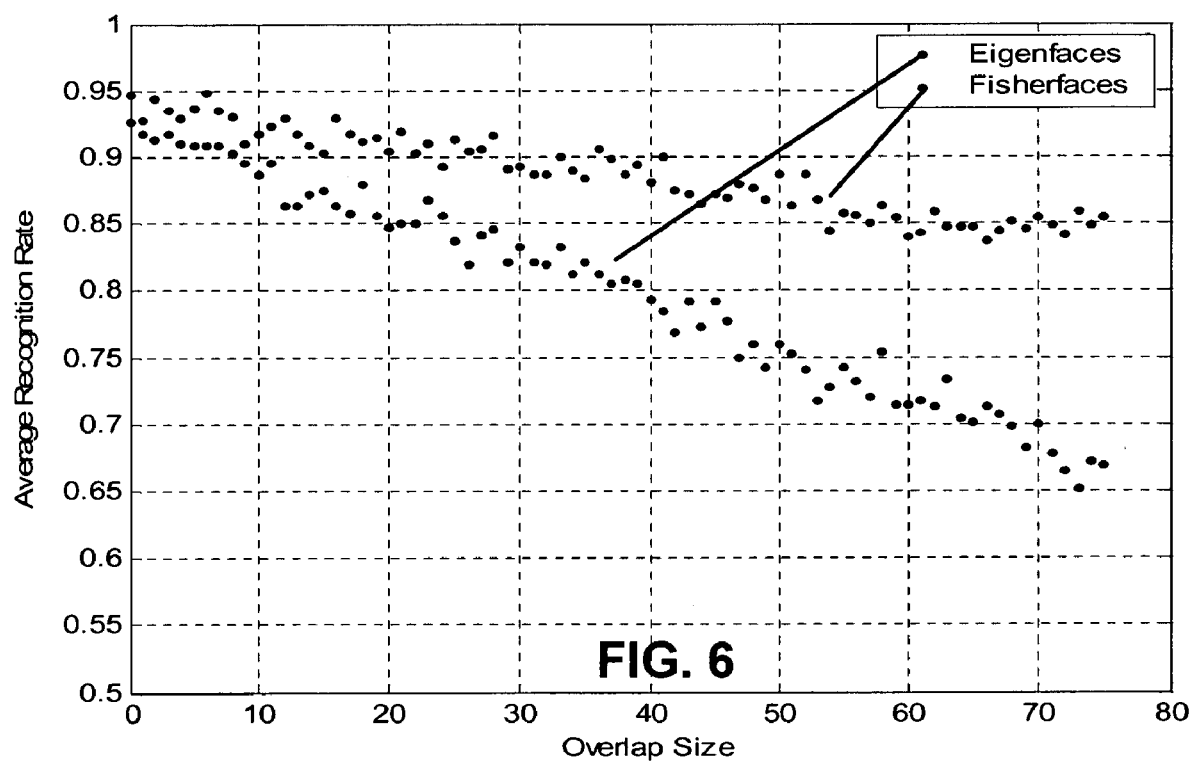
FIG. 6 shows a graph of mean detection and identification rates vs. overlap size.

The next experiment assessed how the overlap size between the gallery and probe sets affected open set performance and the role different representations played. FIG. 6 shows the mean detection and recognition rates for Open Set TCM-kNN using PCA and Fisherfaces representations, and the Mahalanobis+$L_2$ and cosine distances, respectively. There were 150 subjects available, the size for both the gallery and the probe sets was 75 subjects, and the overlap between the gallery list and the probe set varied from 0 to 75 subjects. Reported are the average results obtained over 100 randomized (over gallery and probe composition) runs. The performance goes down, almost linearly, as the overlap size increases. Fisherfaces components yielded overall much better performance compared to PCA components, except for a very small overlap size when the performance observed was closed but still better when using Fisherfaces than PCA components. The explanation for the observed performance is that as the size of overlap increases, it becomes more difficult to detect and identify individuals on overlap set. The performance for the Open Set {PCA, Fisherfaces} classifiers was very poor.

Open Set TCM-kNN also provides measures of credibility and confidence concerning the recognition decisions it makes. The p-value distribution behind Open Set TCM-kNN shows (see FIG. 7) its ability for detection and authentication [see non-overlapping correct rejection (blue) and correct recognition (green) layers separated by the false recognition (red) layer] and supports the use of PSR measurement for rejection.

Watch List

The gallery of wanted individuals is now very small compared to the number of people expected to flood the biometric system (see FIG. 3b). People not on the watch list are "impostors" like, whose negative identification is sought after. The next experiment reported had 150 subjects, three images from each subject, for a total of 450 face images. Compared were the Open Set {PCA, Fisherfaces} and Open Set TCM-kNN classifiers on small watch lists ("galleries"), whose size varied from 10 to 40 subjects, and reported were the mean (average) performance (detection and identification) rates obtained over 100 randomized runs. Let the watch list size be n subjects, each of them having 2 (two) images in the gallery. Then there are 450−2n face images in the probe set, n stands for the number of subjects on the watch list and 3×(150−n) stands for the number of face images that come from subjects that are not on the watch list. The small size of the watch list may require for stability purposes that the rejection threshold be derived from larger populations but still using as before the same statistics of intra- and inter-distance distribution for Open Set {PCA, Fisherfaces} and PSR distribution for Open Set TCM-kNN. The decision thresholds Θ may be derived in a manner similar to that used by cohort models in speech (see the "Open Set TCM-kNN) section) by augmenting the gallery with different subjects randomly drawn from other FERET batches that include illumination and facial expression variation. The size of the gallery used to determine the threshold was kept constant at 80 throughout the runs so the number 80−n of different subjects needed to augment it varied according to the size i of the watch list.

Table 1 (shown in FIG. 10) and Table 2 (shown in FIG. 11) show the mean performance of Open Set {PCA, Fisherfaces} and Open Set TCM-kNN for different watch list sizes. For watch list size n, the accuracy (detection and identification rate) is (average correct rejection+average correct recognition)/(450−2n). The numerical results, when the number of subjects on the watch list is n, is preferably interpreted as follows. Since the watch list size is much smaller than the number of subjects that should be rejected, the (detection and identification rate) accuracy will be very high even if all the probes are rejected. As a consequence the average correct reject number, average correct recognition number, and the detection and identification accuracy are shown for performance evaluation. The average results were better the closer the correct rejection number is to 3×(150−n), the closer the correct recognition number was to the watch list size, and the higher the accuracy was. Table 1 shows the average performance of Open Set {PCA, Fisherfaces} for different watch list sizes. The threshold for rejection was determined from the statistics of intra- and inter-distance distribution (see the "Open Set Recognition" section). The Fisherfaces components outperformed PCA components for both rejection and identification decisions. As the watch list size increased, the performance droped.

Table 2 shows the average performance of Open Set TCM-kNN for different watch list sizes. PCA components and the Fisherfaces components yielded similar performance when using Open Set TCM-kNN. The Fisherfaces components were a little better than PCA when identification decisions were involved. Open Set TCM-kNN was better than Open Set {PCA, Fisherfaces}, when the correct rejection, correct recognition, and the accuracy were taken into account, especially when the watch list size was large. The overall performance for Open Set TCM-kNN, which keeps almost constant as the watch list size increases, was thus more stable than the overall performance displayed by Open Set {PCA, Fisherfaces}.

Figure 7A:
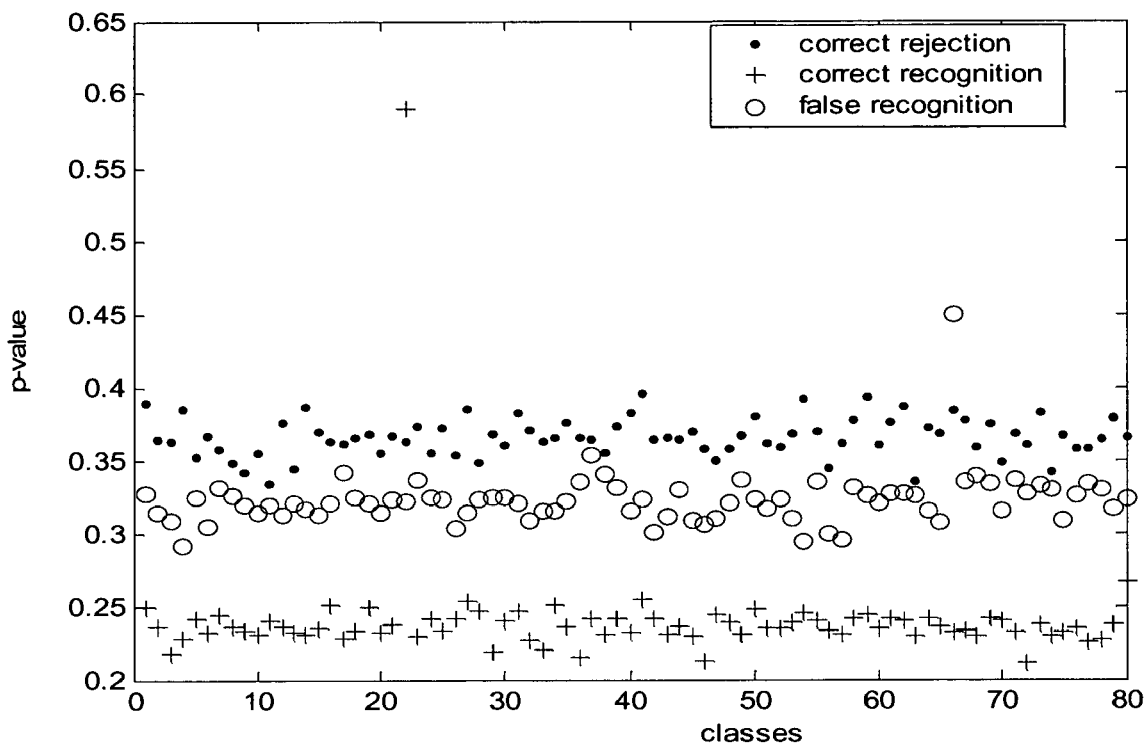
FIG. 7a shows P-value distribution of rejection, correct and false recognition using PCA with Fisherfaces with (Mahalanobis+L2) distance.
Figure 7B:
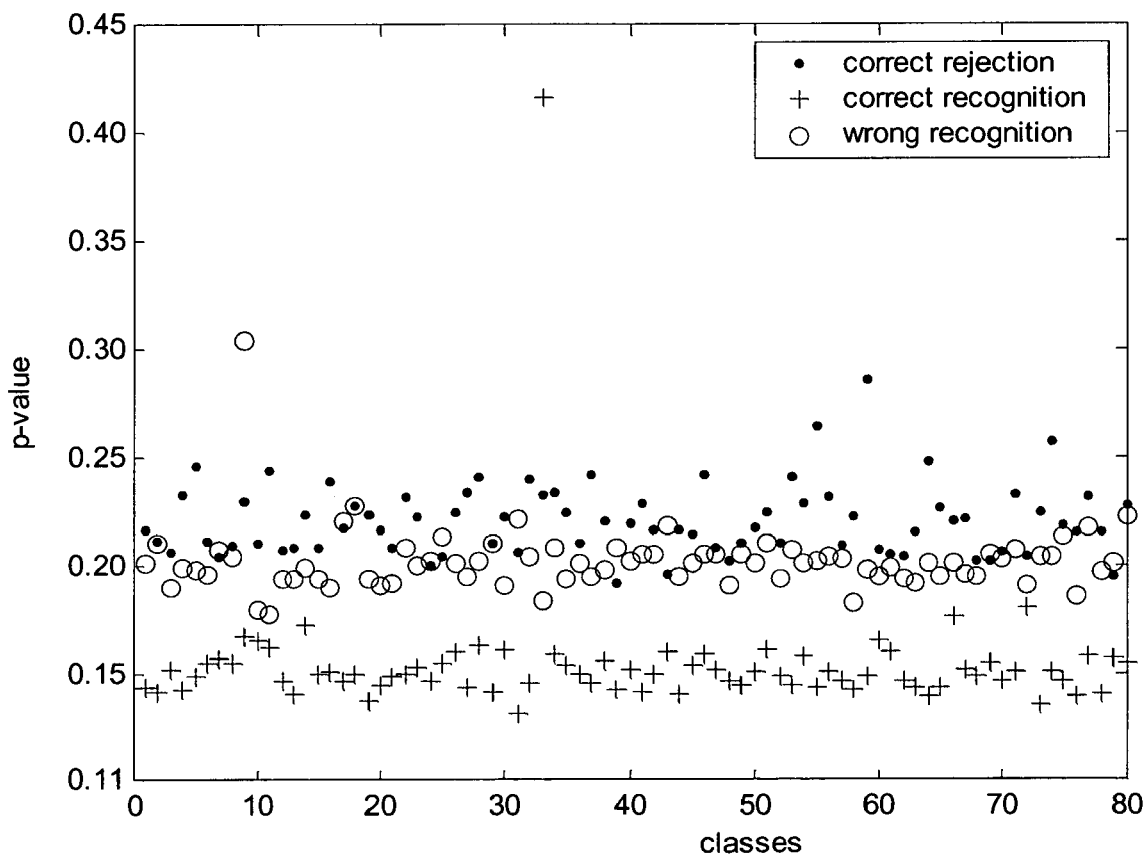
FIG. 7b shows P-value distribution of rejection, correct and false recognition using PCA with Fisherfaces with cosine distance.

The difference in performance between FIG. 6 and Table 2 (in FIG. 10) indicates that the gallery size is also an important factor affecting algorithm performance. In FIG. 7 the gallery (watch list) size is always 75 subjects and only the overlap size between the gallery and probe sets changes, while in Table 2 the gallery size (watch list) varied according to n.

Pattern Specific Error Inhomogeneities Analysis (PSEI)

It is important to know not only what works and to what extent it works, but also to know what does not work and why (Pankanti et al., 2002). Anecdotal evidence suggests that 90% of errors are due to only 10% of the face patterns. The contribution made by face patterns to the overall system error is thus not even. Characterization of individual contributions to the overall face recognition system error has received, however, little attention.

Pattern Specific Error Inhomogeneities (PSEI) analysis (Doddington et al, 1998) shows that the error rates vary across the population. It has led to the jocular characterization of the target population as being composed of "sheep" and "goats". In this characterization, the sheep, for whom authentication systems perform reasonably well, dominate the population, whereas the goats, though in a minority, tend to determine the performance of the system through their disproportionate contribution of false reject errors. Like targets, impostors also have barnyard appellations, which follow from inhomogeneities in impostor performance across the population. Specifically there are some impostors who have unusually good success at impersonating many different targets. These are called "wolves". There are also some targets that are easy to imitate and thus seem unusually susceptible to many different impostors. These are called "lambs".

ROC can be improved if some of the most difficult data (e.g., the "goats", the hard to match subjects) are excluded and/or processed differently. In general, if the tails of the ROC curve do not asymptote at zero FAR and zero FRR, there is probably some data that could be profitably excluded and maybe processed offline. The trick is to find some automatic way of detecting these poor data items (Bolle et al., 2004) and adopt solutions different from "one size fits all."

Next, an approach for PSEI analysis that divides the subjects' faces into corresponding "barnyard" classes is described. The analysis of the error structure in terms of rejection and acceptance decisions follows that of Pankanti et al. (2002) for fingerprints but is driven here by transduction and applied to open set face recognition. There are low matching PSR scores X that, in general, do not generate false rejects, and there are high matching PSR scores Y associated with subjects that generally do not generate false accepts. The corresponding "rejection/mismatch" and "acceptance/match" cumulative distributions for some rejection threshold $\Theta=T$ are $F^T$ and $G^T$:

$$F^T(x) = \#(PSR \leq x | PSR \leq T)/\#(PSR \leq T)$$

$$G^T(y) = \#(PSR \geq y | PSR > T)/\#(PSR > T) \quad (11)$$

As the scores X and Y are samples of ordinal random variables, the Kolmogorov-Smirnov (KS) measure (Conover, 1980) compares the individual score distributions $F_i(x)$ and $G_i(y)$ (see below) for subject i with the (typical) distributions $F^T$ and $G^T$, respectively.

$$F_i(x) = \#(PSR \leq x | PSR \text{ from rejected subject } i)/\#(PSR \text{ from rejected subject } i)$$

$$G_i(y) = \#(PSR \geq y | PSR \text{ from accepted subject } i)/\#(PSR \text{ from accepted subject } i) \quad (12)$$

The distances between the individual and typical distributions for the KS test are $|\Delta_i^F|$ and $|\Delta_i^G|$, respectively, and they quantify the variance in behavior for subject i from the typical behavior. The unsigned $\Delta_i^F$ and $\Delta_i^G$ quantities, however, are used for PSEI analysis because they express how well subject i's match PSR scores agree with well-behaved, easy to correctly reject subjects, and with well-behaved, easy to correctly recognize subjects, respectively.

$$\Delta_i^F = F_i(x_{max}) - F^T(x_{max}) \text{ where } x_{max} = \text{argmax } |F_i(x) - F^T(x)|$$

$$\Delta_i^G = G_i(y_{max}) - G^T(y_{max}) \text{ where } y_{max} = \text{argmax } |G_i(y) - G^T(y)| \quad (13)$$

Negative (positive) $\Delta$ indicates that the average population score belonging to some subject i is lower (higher) than the average (well-behaved) overall population. The identities left (right) of the y-axis display undesirable (desirable) intra-pattern similarity. Similarly, identities above (below) x-axis display desirable (undesirable) inter-pattern similarity. Many identities clustering along the axes imply that co-existence of both (un)desirable match score property and (un) desirable non-match property is very unlikely. Most of the population shows either a central (near origin) tendency or a tendency to deviate along one of the axis. For rejection, positive (negative) $\Delta_i^F$ implies that the average rejection PSR for subject i is higher (lower) than the average rejection PSR for the whole population. For acceptance, negative (positive) $\Delta_i^G$ implies that the average acceptance PSR for subject i is higher (lower) than the average acceptance PSR for the whole population.

Figure 8:
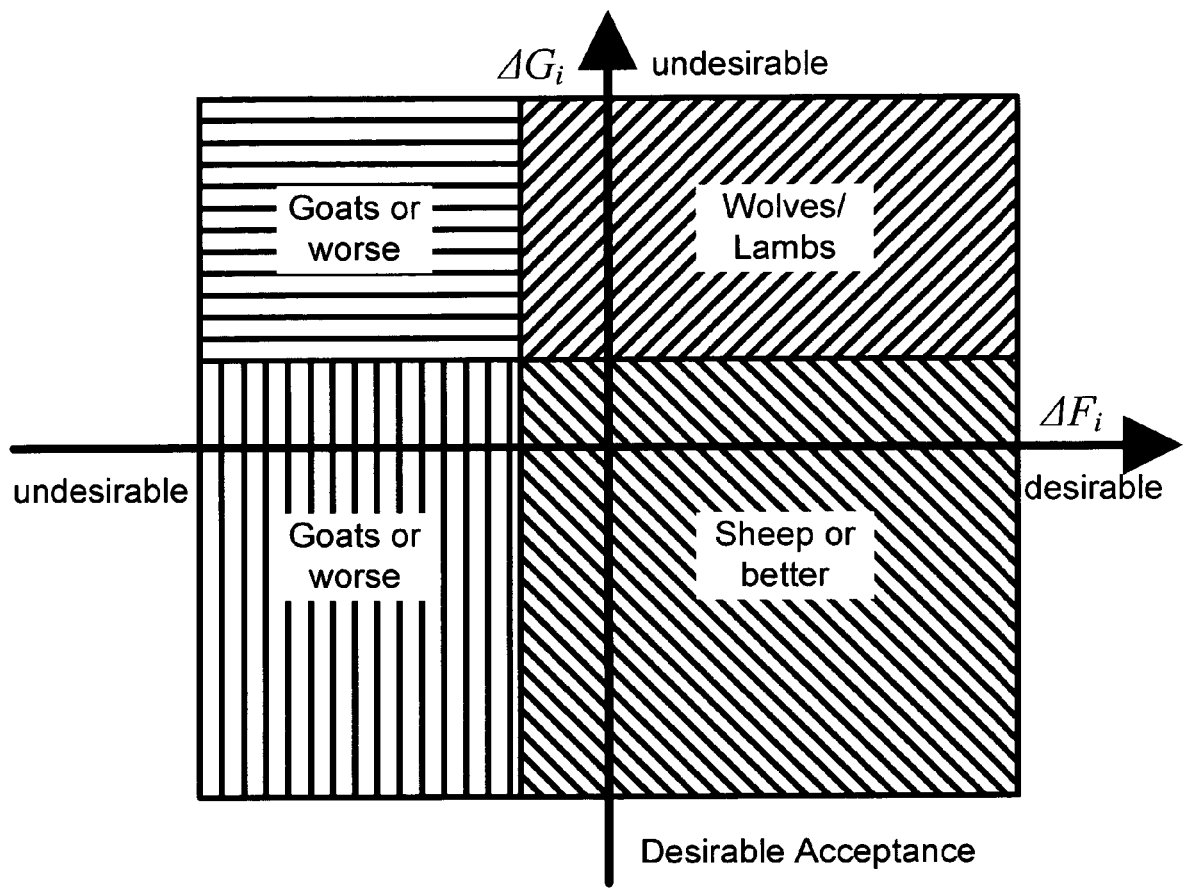
FIG. 8 is a zoo display characterization showing variant behavior for rejection and acceptance.

The different types of animals are located in FIG. 8 using the four-quadrant diagram induced by the 2D scatter plot of $(\Delta_i^F, \Delta_i^G)$. In general, the more negative $\Delta_i^F$ is, the more false acceptance subject i accounts for; the more positive $\Delta_i^G$ is, the more false rejection subject i accounts for. One threshold has to be chosen for deciding what counts as desirable or undesirable behavior. If one assumes that the desirable behavior subject set accounts only for 1% false rejection or false acceptance, one can sort $\Delta_i^F$ and $\Delta_i^G$ and determine the thresholds $T_F$ and $T_G$ such that (i) all subjects for whom $\Delta_i^F \geq T_F$ account only for 1% false acceptance and (ii) all subjects for whom $\Delta_i^G \leq T_G$ account only for 1% false acceptance. Most of the sheep occupy the forth quadrant and are characterized by desirable rejection behavior when $\Delta_i^F$ is greater than $T_F$ and desirable acceptance behavior when $\Delta_i^G$ is less than $T_G$. Note that if the PSR value of the probe is far away from the threshold, the decisions are easy to make; only the parts of the distributions near thresholds are likely to contribute to errors and need to be considered. The first quadrant is characteristic of subjects that display desirable rejection behavior (when they should be indeed rejected) but also of subjects showing undesirable rejection behavior (when they should be accepted) (wolves/lambs). The second quadrant includes subjects that are difficult to label in terms of rejection or recognition (goats). The third quadrant is characteristic of subjects that display desirable acceptance behavior (when they should be accepted) but also of subjects showing undesirable acceptance behavior when they should be instead rejected (goats). Finally, the fourth quadrant represents subjects with good performance (sheep).

Figure 9A:
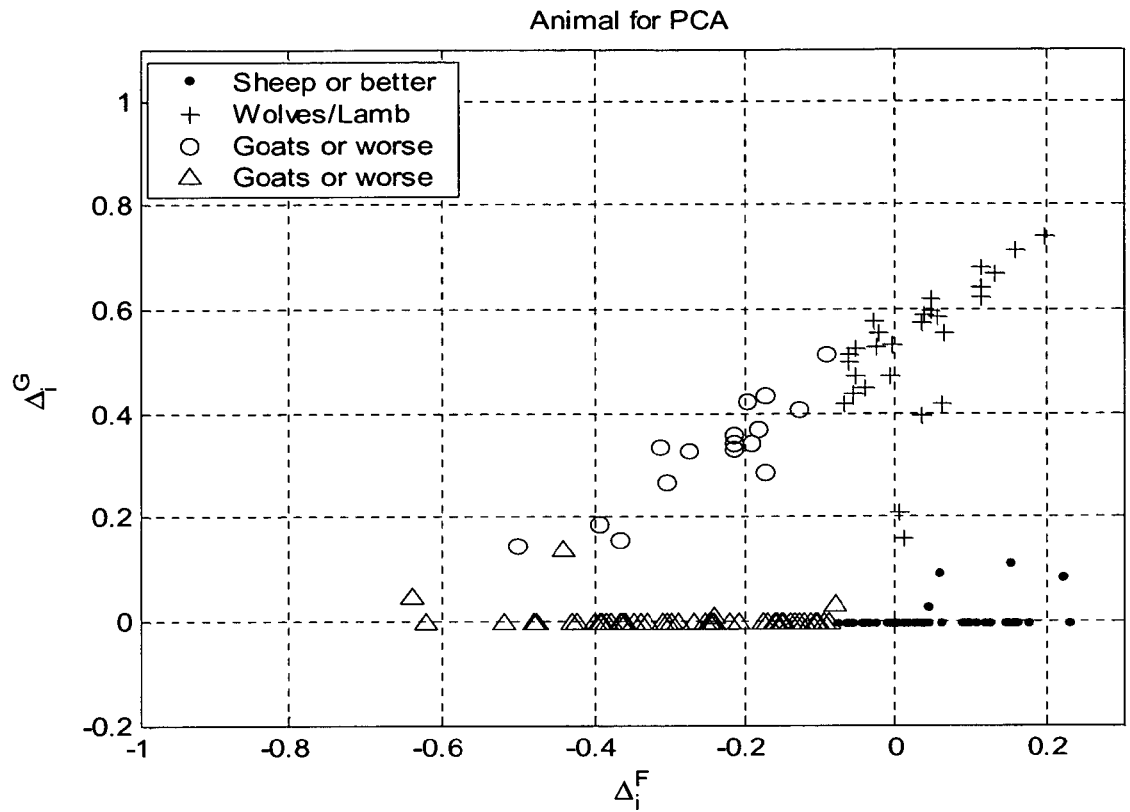
FIG. 9a is an Open set TCM-kNN "PCA" 2D scatter plot.
Figure 9B:
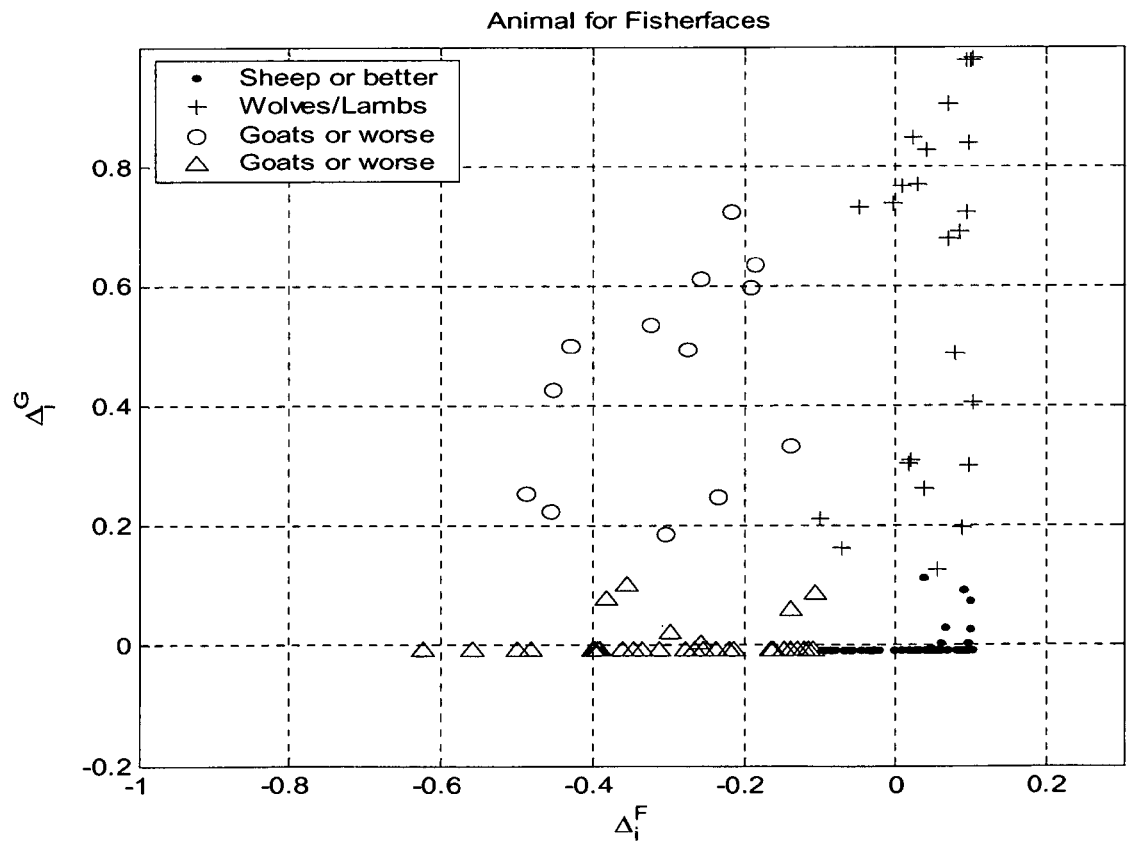
FIG. 9b is an Open set TCM-kNN "Fisherfaces" 2D scatter plot.

Open Set TCM-kNN using either PCA or Fisherfaces components is run 1,000 times to yield the corresponding PSR scores. The overlap, of size m=40, between the gallery and test sets of size 80, is randomly chosen. The 2D scatter plots (for 150 subjects) of $(\Delta_i^F, \Delta_i^G)$ for Open Set TCM-kNN using PCA and Fisherfaces, respectively, are shown in FIGS. 9a and 9b, respectively. Most of the subjects show a central (near origin) tendency with good performance. Several subjects show the tendency to deviate along one of the axis. Only few subjects show undesirable characteristics along both axes. The average false rejection and false acceptance rates for Open Set TCM-kNN using PCA components are 13.36% and 8.29%, respectively. The subjects with the top 10 (20) $\Delta_i^G$ values contribute 24.76% (50.09%) of total false rejection. The subjects with top 10 (20)–$\Delta_i^F$ values contribute 28.54% (49.85%) of total false acceptance. The average false rejection and false acceptance rates for Open Set TCM-kNN using Fisherfaces are 8.33% and 4.37%, respectively. The subjects with top 10 (20) $\Delta_i^G$ values contribute 32.19% (62.64%) of total false rejection. The subjects with top 10 (20)–$\Delta_i^F$ values contribute 38.74% (68.83%) of total false acceptance.

The decision threshold is determined based on the above discussion for both PCA and Fisherfaces components. For PCA, there are 52 (34.67%) subjects classified as Sheep or better, 28 (18.67%) as Wolves/Lambs, and 54 (36%) as Goats or worse in the third quadrant. Only 16 (10.67%) subjects are classified as Goats or worse in the second quadrant, and they contribute to both 22.92% false rejection and 20.94% false acceptance. 37% of subjects are error prone animals (not sheep) and they contribute about 98.2% and 98.9% of the total false rejection and false acceptance errors, respectively. For Fisherfaces, there are 78 (52%) subjects classified as Sheep or better, 24 (16%) as Wolves/Lambs, and 35 (23.3%) as Goats or worse in the third quadrant. Only 13 (8.67%) subjects are classified as Goats or worse in the second quadrant, and they contribute to both 32.1% false rejection and 29.0% false acceptance. 48% of subjects are error prone animals (not sheep), and they contribute about 98.9% and 98.5% of total false rejection and false acceptance errors, respectively. All the error prone animals contribute to either false rejection or false acceptance for both PCA and Fisherfaces components. If some error prone animals are removed from the test set, the performance for Open Set TCM-kNN will improve. As an example, if all Goats or worse in the second quadrant are removed for PCA and Fisherfaces, and the experiments in the "Open Set Face Recognition" section are redone, the Open Set TCM-kNN performance improves and it now achieves 85.69% and 91.63% accuracy (at FAR=3%) for PCA and Fisherfaces, respectively, vs. the earlier results of 81% and 88% accuracy (at FAR=6%).

Data Fusion

The overlap in labeling between Open Set TCM-kNN {PCA and Fisherfaces} regarding error prone animals discussed in the previous section reveals useful insights about their comparative contributions and suggests the possibility to fuse their outputs for enhanced authentication. Note that data fusion for the outputs of different face recognition engines is a particular case of information fusion (Ross and Jain, 2004) for multi(modal)-biometric systems (Jain and Ross, 2004) where different modalities, e.g., fingerprints, face and hand geometry, are used. Multimodal biometrics that combines face and fingerprints have been shown to yield significant performance improvement over single-mode biometric systems (Snelick et al., 2003). Describe next is how multi-system fusion using Open Set TCM-kNN {PCA and Fisherfaces} driven by PSEI analysis yields better performance for authenticating those subjects that are rejected by one classifier and accepted by another classifier.

Assume that during Open Set TCM-kNN the thresholds $\Theta$, the training PSR standard deviations, the probe PSR values and confidences for PCA and Fisherfaces are $\Theta_{PCA}$ and $\Theta_{Fisher}$, $Stdev_{PCA}$ and $Stdev_{Fisher}$, $PSR_{PCA}$ and $PSR_{Fisher}$, $C_{PCA}$ and $C_{Fisher}$, respectively. The first case occurs when the probe is accepted if both $PSR_{PCA} \geq \Theta_{PCA}$ and $PSR_{Fisher} \geq \Theta_{Fisher}$. The identification of the probe may then be determined as follows: (i) If Open Set TCM-kNN {PCA and Fisherfaces} yield the same ID for their largest (credibility) p-values, then the decision taken is to authenticate the ID no matter what the confidences are; and (ii) If the Open Set TCM-kNN {PCA, Fisherfaces} yield different ID for their largest p-values, then choose that ID that yields larger confidence. In the case when the two confidences are very close to each other, choose the label coming from Open Set TCM-kNN Fisherfaces classifier because it yields better performance than Open Set TCM-kNN PCA classifier (see the "open Set Face Recognition" section).

The second case occurs when the probe is rejected if both $PSR_{PCA} < \Theta_{PCA}$ and $PSR_{Fisher} < \Theta_{Fisher}$. The third possible case occurs when $PSR_{PCA} \geq \Theta PCA$ and $PSR_{Fisher} < \Theta_{Fisher}$, i.e., the two engines disagree if rejection should take place. One has now to consider how far the probe PSRs are away from the thresholds $\Theta$ and the relative location of the class predicted by Open Set TCM-KNN PCA in the zoo. When the label predicted by Open Set TCM-KNN PCA is a sheep, the probe is accepted and its ID is that predicted. If the label predicted by Open Set TCM-kNN PCA is not a sheep then compare the following distances $\alpha = (PSR_{PCA} - \Theta_{PCA})/Stdev_{PCA}$ and $\beta = (\Theta_{Fisher} - PSR_{Fisher})/Stdev_{Fisher}$. If min $(\alpha, \beta) < T_0 = 2$, i.e., two additional standard deviations, then if $\alpha > \beta$ the ID that Open Set TCM-kNN PCA predicts is accepted; otherwise the probe is preferably rejected. If min $(\alpha, \beta) > T_0$, the probe is rejected using the very decision Open Set TCM-kNN Fisherfaces classifier makes. Similar arguments apply for the last case when $PSR_{PCA} < \Theta_{PCA}$ and $PSR_{Fisher} \Theta_{Fisher}$. Using the data fusion procedure described above, the experiments in the "Open Set Face Recognition" section were redone to yield now 91.55% accuracy and only 3.1% false alarm vs. 81% and 88% correct accuracy and false alarm of 6% without fusion. Note that one achieves 91% accuracy without excluding any error prone exemplar (see the "Pattern Specific Error Inhomogeneities Analysis (PSEI) section). Note that PCA and Fisherfaces are not independent representations. Some animals were observed to continue to be error prone after the LDA step (of Fisherfaces) once they were bad for PCA. In the described data set, only 33 subjects are sheep for both PCA and Fisherfaces components, while 64 subjects are sheep for either PCA or Fisherfaces components.

REFERENCES

The following references are included to provide background information for this disclosure. They have been referenced at appropriate points throughout this disclosure a by author and year.

E. Bailly-Bailliere et al. (2003), The BANCA Database and Evaluation Protocol, *4th Audio-Video Based Person Authentication (AVBPA)*, 625-638.

S. Bengio, J. Mariethoz, and S. Marcel (2001), Evaluation of Biometric Technology on XM2VTS, IDIAP-RR 01-21, European Project BANCA Deliverable D71, Martigny, Switzerland.

A. Blum and T. Mitchell (1998), Combining Labeled and Unlabeled Data with Co-Training, in COLT: Proc. of the Workshop on Computational Learning Theory, Morgan Kaufmann, 92-100.

R. M. Bolle, J. H. Connell, S. Pankanti, N. K. Ratha, and A. W. Senior (2004), Guide to Biometrics, Springer.

R. Chellappa, C. L. Wilson and S. Sirohey (1995), Human and Machine Recognition of Faces: A Survey, Proc. IEEE, Vol. 83, No. 5, 705-740.

T. M. Cover and P. E. Hart (1967), Nearest neighbor pattern classification, IEEE Trans. Inform. Theory IT 13:21-7.

P. Grother (2004), Face Recognition Vendor Test 2002, Supplemental Report-NISTIR 7083.

J. Daugman (1997), Face and Gesture Recognition: Overview, IEEE Trans. on PAMI, Vol. 19, 7, 675-676.

G. R. Doddington, W. Liggett, A. Martin, M. Przybocki and D. Reynolds (1998), Sheep, Goats, Lambs and Wolves: A Statistical Analysis of Speaker Performance, Proc. Of IC-SLD'98, 1351-1354.

S. Furui (1997), Recent Advances in Speaker Recognition, Pattern Recognition Letters, 18, 859-872.

A. Gammerman, V. Vovk, and V. Vapnik (1998), Learning by Transduction. In Uncertainty in Artificial Intelligence, 148-155.

A. Jain, R. Bolle, and S. Pankanti (Eds.) (1999), BIOMETRICS—Personal Identification in Networked Society, Kluwer.

A. Jain and A. Ross (2004), Multibiometric Systems, Comm. of ACM, Vol. 47, No. 1, 34-40.

T. Joachims (1999), Transductive Inference for Text Classification Using Support Vector Machines, in I. Bratko and S. Dzeroski (eds.), Proc. Of ICML-99, 16th Int. Conf. on Machine Learning, Bled, Slovenia, Morgan Kaufmann, 200-209.

P. Juszczak and R. P. W. Duin (2004), Selective Sampling Based on the Variation in Label Assignment, 17th Int. Conf. on Pattern Recognition (ICPR), Cambridge, England.

M. A. Krogel and T. Scheffer (2004), Multi-Relational Learning, Text Mining, and Semi-Supervised Learning from Functional Genomics, Machine Learning, 57, 61-81.

M. Kukar and I. kononenko (2002), Relaible Classifications with Machine Learning, 13th European Conf. on Machine Learning (ECML), Helsinki, Finland.

M. Li and P. Vitanyi (1997), An Introduction to Kolmogorov Complexity and Its Applications, 2nd. Springer-Verlag.

C. Liu and H. Wechsler (2002), Gabor Feature Based Classification Using the Enhanced Fisher Linear Discriminant Model for Face Recognition, IEEE Trans. on Image Processing, Vol. 11, No. 4, 467-476.

C. Liu and H. Wechsler (2004), Facial Recognition in Biometric Authentication: Technologies, Systems, Evaluations and Legal Issues, J. L. Wayman, A. Jain, D. Maltoni and D. Maio (Eds.), Springer-Verlag (to appear).

M. W. Mak, W. D. Zhang and M. X. He (2001), A New Two-Stage Scoring Normalization Approach to Speaker Verification," Proc. Int. Sym. on Intelligent Multimedia, Video and Speech Processing, pp. 107-110, Hong Kong.

T. Melluish, C. Suanders, I. Nouretdinov, I and V. Vovk (2001), The Typicalness Framework: A Comparison with the Bayesian Approach. TR, Dept. of Computer Science, Royal Holloway, University of London, http://www.clrc.rhul.ac.uk/tech-report/.

T. Mitchell (1999), The Role of Unlabelled Data in Supervised Learning, Proc. 6th Int. Colloquium on Cognitive Sciences, San Sebastian, Spain.

K. Nigam, A. K. McCallum, S. Thrun and T. M. Mitchell (2000), Text Classification from Labeled and Unlabeled Documents Using EM, Machine Learning, 39 (2/3), 103-134.

S. Pankanti, N. K. Ratha and R. M. Bolle (2002), Structure in Errors: A Case Study in Fingerprint Verification, 16th Int. Conf. on Pattern Recognition, Quebec-City, Canada.

P. J. Phillips, H. Wechsler, J. Huang, and P. Rauss (1998), The FERET Database and Evaluation Procedure for Face Recognition Algorithms, Image and Vision Computing, Vol. 16, No. 5, 295-306.

P. J. Phillips, P. Grother, R. J. Micheals, D. M. Blackburn, E. Tabassi and M. Bone (2003), Face Recognition Vendor Test 2002—Overview and Summary.

K. Proedrou, I. Nouretdinov, V. Vovk and A. Gammerman (2001), Transductive Confidence Machines for Pattern Recognition, TR CLRC-TR-01-02, Royal Holloway University of London.

D. A. Reynolds, T. F. Quatieri, and R. B. Dunn (2000), Speaker Verification Using Adapted Gaussian Mixture Models, Digital Signal Processing 10, 19-41.

A. Ross and A. Jain (2004), Information fusion in Biometrics, Pattern Recognition Letters, Vol. 24, 2115-2125.

C. Saunders, A. Gammerman, and V. Vovk (1999), Transduction with Confidence and Credibility, 16th Int. Joint Conf. on Artificial Intelligence (IJCAI), Stockholm, Sweden.

R. Snelick, M. Indovina, J. Yen, and A. Mink (2003), Multimodal Biometrics: Issues in Design and Testing, ICMI'03, Vancouver, BC, Canada.

S. Tong and D. Koller (2001), Support Vector Machines Active Learning with Applications to Text Classification, Journal of Machine Learning Research, Vol. 2, 45-66

V. N. Vapnik (1998), Statistical Learning Theory, Wiley.

V. N. Vapnik (2000), The Nature of Statistical Learning Theory, 2nd. Ed., Springer-Verlag.

W. J. Conover, Practical Nonparametric Statistics, John Wiley & Sons, Inc. 1980.

V. Vovk, A. Gammerman and C. Saunders (1999), Machine-Learning Application of Algorithmic Randomness, Proceedings of the 16th International Conference on Machine Learning, Bled, Slovenia.

W. Zhao, R. Chellappa, P. J. Phillips, and A. Rosenfeld (2003), Face Recognition: A Literature Survey, Computing Surveys, Vol. 35, No. 4, 399-458.

Conclusions

This disclosure describes Open Set TCM-kNN (Transduction Confidence Machine-k Nearest Neighbors), a novel realization of transductive inference, for Open Set face recognition and showed its comparative advantages. Extensive experimental data, using challenging FERET data, shows that multi-class transductive inference using a priori threshold setting driven by PSR benefit open set identification and watch list, provides meaningful error analysis and determines face patterns difficult to authenticate, and facilitate data fusion.

The proposed rejection functionality for open set recognition is similar to that used in detection theory, hypothesis testing, and score normalization. The availability of the reject option, i.e., "none of the above" answer, in open set recognition, is similar to outlier detection (in clustering) and novelty detection of odd/strange data points in clustering. The comparative advantages of the present invention comes from its non-parametric implementation and automatic threshold selection. No assumptions are made regarding the underlying probability density functions responsible for the observed data clusters, i.e., the face IDs. Learning and training, driven by transduction, are local. Open set recognition provides robust information to detect outlier faces, i.e., unknown faces, and to reject them accordingly. Outlier detection corresponds to change detection when faces or patterns change their appearance and provides for novelty detection.

The acquisition and/or generation of additional exemplars for each class (to increase k in Open Set TCM-kNN) should lead to further improvements in performance. In addition to the invention as described, it may be possible to combine transductive inference, active learning, co-training and normalization methods. The active learner has to decide whether or not to request labels ("classification") for unlabeled data in order to reduce both the volume of computation and the human effort involved in labeling (Tong and Keller, 2001). Active learning selects, one by one, the most informative patterns from some working set W, such that, after labeling by an expert ("classifier"), they will guarantee the best improvement in the classifier performance. As an example, the sampling strategy proposed by Juszczak and Duin (2004) relies on measuring the variation in label assignments (of the unlabeled set) between the classifier trained on T and the classifier trained on T with a single unlabeled exemplar e labeled with all possible labels. The use of unlabeled data, independent of the learning algorithm, is characteristic of co-training (Blum and Mitchell, 1998; Nigam et al., 2000). The idea of co-training is to eventually learn two classifiers which bootstrap each other using labels for the unlabeled data (Krogel and Scheffer, 2004). Co-training may lead to improved performance if at least one classifier labels at least one unlabeled instance correctly for which the other classifier currently errs. Unlabeled examples which are confidently labeled by one classifier are then added, with labels, to the training set of the other classifier.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. Although parts of the disclosure described the claimed invention being used in face recognition applications, one skilled in the art will recognize that the claimed invention is in fact much broader. For example, the claimed invention may be used to recognize other types of patterns such as DNA sequences, fingerprints, satellite imagery, or integrated circuits. Additionally, samples may be a multitude of samples and the one gallery sample is a multitude of gallery samples (i.e. clouds of samples). These clouds of samples may include various types of data including still frames, video clips, etc.

What is claimed is:

1. A pattern recognition system comprising:
    a) at least one capture device configured to acquire at least one sample, each of said at least one sample associated with a sample identifier;
    b) a basis configured to encode at least one of said at least one sample, said basis derived using a multitude of representative training samples;
    c) at least one feature extractor configured to generate at least one signature from at least one of said at least one sample using said basis;
    d) a gallery, said gallery including at least one gallery sample, each of said at least one gallery sample being one of said at least one signature;
    e) a rejection threshold, said rejection threshold created using a rejection threshold learning mechanism, said rejection threshold learning mechanism configured to calculate said rejection threshold using at least one of said at least one sample by:
        i) swapping one of said sample identifier with other possible said sample identifier;
        ii) computing a credibility value (p) for each of the swapped sample identifiers;
        iii) deriving a peak-to-side ratio (PSR) distribution using a multitude of said credibility value; and
        iv) determining said rejection threshold using said peak-to-side ratio distribution;
    f) a storage mechanism configured to store at least one of said at least one gallery sample; and
    g) an open set recognition stage configured to authenticate or reject as unknown the identity of at least one unknown sample, by:
        i) deriving a set of credibility values by iteratively assign each of the gallery identifiers to the unknown sample and calculating a credibility value;
        ii) deriving a peak-to-side ratio for said unknown sample using said set of credibility values;
        iii) comparing said peak-to-side ratio for said unknown sample to said rejection threshold;
        iv) rejecting said unknown sample as unknown if said peak-to-side ratio is less than or equal to said rejection threshold; and
        v) finding the closest of said at least one gallery sample if said peak-to-side ratio is greater than said rejection threshold.

2. A system according to claim 1, wherein said step of finding the closest of said at least one gallery sample if said peak-to-side ratio is greater than said rejection threshold includes calculating a credibility value for the closest of said at least one gallery sample.

3. A system according to claim 1, wherein said step of finding the closest of said at least one gallery sample if said peak-to-side ratio is greater than said rejection threshold includes calculating a confidence value for the closest of said at least one gallery sample.

4. A system according to claim 1, further including an error analysis stage configured to identify difficult to recognize samples.

5. A system according to claim 4, wherein said difficult to recognize samples are processed using data fusion techniques.

6. A system according to claim 4, wherein said difficult to recognize samples are processed using multiple representations.

7. A system according to claim 1, wherein at least one of said at least one sample is a biometric sample.

8. A system according to claim 1, wherein said basis is used to derive standard PCA and/or Fisherfaces coefficients.

9. A system according to claim 1, wherein said basis is pre-derived using at least some of said multitude of representative training samples.

10. A system according to claim 1, wherein at least one of said at least one capture device is one of the following:
    a) a still image camera;
    b) a video camera;
    c) a micro array; and
    d) a data acquisition instrument.

11. A system according to claim 1, further including at least one quality checker configured to evaluate quality of at least one of said at least one sample using a calculated signal to noise ratio.

12. A system according to claim 1, wherein at least one of said at least one sample is an image of a face.

13. A system according to claim 1, wherein said at least one sample is a multitude of samples and said one gallery sample is a multitude of gallery samples.

14. A system according to claim 1, wherein the pattern recognition system is used for outlier detection when engaged in clustering.

15. A system according to claim 1, wherein the pattern recognition system is used for novelty detection.

16. A system according to claim 1, wherein the pattern recognition system is used for change detection.

17. A pattern recognition method comprising using a system to perform the steps of:
    a) acquiring at least one sample acquired from at least one capture device, each of said at least one sample associated with a sample identifier;
    b) encoding at least one of said at least one sample using a basis, said basis derived using a multitude of representative training samples;
    c) generating at least one signature from at least one of said at least one sample using said basis;
    d) storing at least one of said at least one signature in a gallery, each of said at least one signature being a gallery sample;

e) calculating a rejection threshold using at least one of said at least one sample by:
   i) swapping one of said sample identifier with other possible said sample identifier;
   ii) computing a credibility value (p) for each of the swapped sample identifiers;
   iii) deriving a peak-to-side ratio (PSR) distribution using a multitude of said credibility value; and
   iv) determining said rejection threshold using said peak-to-side ratio distribution; and
f) authenticating or rejecting as unknown the identity of at least one unknown sample, by:
   i) deriving a set of credibility values by iteratively assign each of the gallery identifiers to the unknown sample and calculating a credibility value;
   ii) deriving a peak-to-side ratio for said unknown sample using said set of credibility values;
   iii) comparing said peak-to-side ratio for said unknown sample to said rejection threshold;
   iv) rejecting said unknown sample as unknown if said peak-to-side ratio is less than or equal to said rejection threshold; and
   v) finding the closest of said at least one gallery sample if said peak-to-side ratio is greater than said rejection threshold.

18. A method according to claim 17, wherein said step of finding the closest of said at least one gallery sample if said peak-to-side ratio is greater than said rejection threshold includes calculating a credibility value for the closest of said at least one gallery sample.

19. A method according to claim 17, wherein said step of finding the closest of said at least one gallery sample if said peak-to-side ratio is greater than said rejection threshold includes calculating a confidence value for the closest of said at least one gallery sample.

20. A method according to claim 17, further including the step of selecting features for enhanced pattern recognition using strangeness and a p-value function where the stranger the feature values are the better the discrimination between patterns.

21. A method according to claim 17, wherein at least one of said at least one sample is a biometric sample.

* * * * *